United States Patent
Kobayashi et al.

(10) Patent No.: US 6,825,898 B2
(45) Date of Patent: Nov. 30, 2004

(54) LENS ARRAY SUBSTRATE AND LIQUID CRYSTAL DISPLAY APPARATUS

(75) Inventors: Keiji Kobayashi, Shiga (JP); Osamu Nishizaki, Nara (JP); Gouo Kurata, Shiga (JP); Hiroyuki Miyamoto, Shiga (JP)

(73) Assignee: Omron Corporation, Kyoto (JP)

( * ) Notice: Subject to any disclaimer, the term of this patent is extended or adjusted under 35 U.S.C. 154(b) by 83 days.

(21) Appl. No.: 10/274,504

(22) Filed: Oct. 18, 2002

(65) Prior Publication Data

US 2003/0081153 A1 May 1, 2003

(30) Foreign Application Priority Data

Oct. 26, 2001 (JP) ......................................... 2001-330023

(51) Int. Cl.[7] ............................................ G02F 1/1335
(52) U.S. Cl. ......................... 349/95; 359/619; 257/232
(58) Field of Search ............................ 349/95; 359/263, 359/619, 622, 485; 257/232, 432, 435, 437

(56) References Cited

U.S. PATENT DOCUMENTS

| 5,430,562 | A  | * | 7/1995  | Fushimi et al. ............... 349/5 |
| 5,550,656 | A  | * | 8/1996  | Sprague et al. ............... 349/5 |
| 5,581,379 | A  | * | 12/1996 | Aoyama et al. ............... 349/5 |
| 6,188,094 | B1 | * | 2/2001  | Kochi et al. ................ 257/232 |
| 6,518,640 | B2 | * | 2/2003  | Suzuki et al. ............... 257/432 |
| 6,623,999 | B1 | * | 9/2003  | Nishikawa ................... 438/29 |

* cited by examiner

*Primary Examiner*—Tarifur R. Chowdhury
*Assistant Examiner*—P. R. Akkapeddi
(74) *Attorney, Agent, or Firm*—Osha & May L.L.P.

(57) ABSTRACT

A lens array substrate and an image displaying device which can prevent unstable operation and malfunction of the TFTs by suppressing the rise in the temperature of liquid crystal display panel are provided. According to the invention, a lens resin layer and a sealing resin layer are provided on the glass substrate, and a lens array is formed at the interface of the lens resin layer and the sealing resin layer which have different refractive indexes from each other. On a cover substrate provided on the sealing resin layer, a light blocking member comprising a material with high reflectance such as Al and Ag is formed along the region corresponding to the boundary edges between the lenses in the lens array, then, a transparent electrode is formed on the all surface of the cover substrate via the light blocking member.

11 Claims, 32 Drawing Sheets

LENS ARRAY SUBSTRATE AND LIQUID CRYSTAL DISPLAY APPARATUS

FIELD OF THE INVENTION

The present invention relates to a lens array substrate and a liquid crystal display. Particularly, the invention relates to the liquid crystal display and the lens array substrate used for the above display which is used in a projector.

BACKGROUND OF THE INVENTION

A transmissive liquid crystal display mainly comprises a liquid crystal panel and a power source device (back light). FIG. 1 is an exploded perspective view that schematically shows the inner structure of a liquid crystal display panel 1. The transmissive liquid crystal display panel 1 comprises a back substrate 2, a front substrate 3, and a liquid crystal layer 4 which is sealed therebetween. The back substrate 2 comprises pixel electrodes 6 and TFTs (thin film transistor) 7 formed for each pixel region on the surface of a glass substrate 5, and an orientation film 8 is formed on the pixel electrodes and TFTs. In the front substrate 3, color filters 10 for red (R), green (G) and blue (B) are formed on the back surface of a glass substrate 9, a transparent electrode (ITO) 11 is formed to cover the back surfaces of all the color filters, and an orientation film 12 is formed on the transparent electrode 11. The liquid crystal layer 4 is filled in a space formed between the orientation film 12 on the front substrate 3 and the orientation film 8 on the back substrate 2, and the periphery of the liquid crystal layer 4 is sealed with a sealing spacer (not shown). The back surface of the back substrate 2 and the front surface of the front substrate 3 have polarizing plates 13 and 14, respectively on the opposite sides.

Light is emitted by a light source device from the back of the liquid crystal display panel 1, and ON/OFF state of the voltage applied to each pixel electrode 6 and the transparent electrode 11 is controlled by the TFTs 7, to control the transmission and the blocking of the light in each pixel on the liquid crystal display panel 1, in order to generate an image.

In the liquid crystal display panel 1, the gaps between the color filters 10 are covered with black matrixes 15 to prevent the light from the light source from passing through the gaps, in order to improve the contrast in an image for a sharp image. The black matrixes 15 are made from a light-absorbing resin or a chromium film. The matrixes 15 are formed by printing, deposition or sputtering, then patterns are formed thereon by the photolithography.

On the other hand, the liquid crystal display is used in commercially available presentation tools such as a liquid crystal projector, as well as used as a display section of a personal computer (PC), a personal digital assistant (PDA), and a mobile phone. Particularly, the liquid crystal projector is commonly used as a projector for presentation in a meeting, or as a digital cinema.

FIG. 2 illustrates the construction of a color liquid crystal projector 21. A light source device 22 such as a halogen lamp having a reflector is provided with a dichroic mirror 23 in front of the device 22 at an angle of 45°, which transmits only blue light 34B while reflects red light 34R and green light 34G. In the direction to which the light passed through the dichroic mirror 23 proceeds, a total reflection mirror 24 is provided at an angle of 45°, and in the direction to which the light reflected by the total reflection mirror 24 proceeds, a liquid crystal display panel 25 for single color for generating a blue image is provided, which, in turn faces the side surface of a prism 26 having reflective surfaces in two directions. In the direction to which the light reflected by the dichroic mirror 23 proceeds, a dichroic mirror 27 which reflects green light 34G while transmits red light 34R is provided at an angle of 45°, and in the direction to which the light reflected by the dichroic mirror 27 proceeds, a liquid crystal display panel 28 for single color for generating a green image is provided, which, in turn faces the back surface of the prism 26. In the direction to which the light passed through the dichroic mirror 27 proceeds, a total reflection mirror 29 is provided at an angle of 45°, and in the direction to which the light reflected by the total reflection mirror 29 proceeds, a total reflection mirror 30 is provided at an angle of −45°, and in the direction to which the light reflected by the total reflection mirror 30 proceeds, a liquid crystal display panel 31 for single color for generating a red image is provided, which, in turn faces another side surface of the prism 26. A projection lens 32 is provided on the front surface of the prism 26.

In the white light emitted from the light source device 22, blue light 34B passes through the dichroic mirror 23, reflected by the total reflection mirror 24, then incident on the liquid crystal display panel 25. When the blue light irradiates on the liquid crystal display panel 25, the light passed through the liquid crystal display panel 25 generates a blue image, which, in turn, is reflected to the forward direction by the reflection surface of the prism 26. In the white light emitted from the light source device 22, green light 34G is reflected by the dichroic mirror 23, reflected by the dichroic mirror 27, then incident on the liquid crystal display panel 28. When the green light 34G irradiates on the liquid crystal display panel 28, the light passed through the liquid crystal display panel 28 generates a green image, which, in turn, passes through the prism 26. In the white light emitted from the light source device 22, red light 34R is reflected by the dichroic mirror 23, passes through the dichroic mirror 27, reflected by the total reflected mirrors 29 and 30, then incident on the liquid crystal display panel 31. When the red light 34R irradiates on the liquid crystal display panel 31, the light passed through the liquid crystal display panel 31 generates a red image, which, in turn, is reflected to the forward direction by the reflection surface of the prism 26.

Thus, the blue image generated on the liquid crystal display panel 25, the green image generated on the liquid crystal display panel 28, and the red image generated on the liquid crystal display panel 31 are superimposed by the prism 26 to make a color image, which, in turn is projected on the projection lens 32. The color image passed through the projection lens 32 is focused on the front screen 33. The front screen 33 thus display the color image.

In this technical field, there is a need for a smaller projector having higher luminance in order to improve the usability and the quality of an image. Also, there is a need for a liquid crystal projector and a personal computer to have higher resolution. In response, the number of the pixels on the liquid crystal display panel is expanding. However, even if a pixel is reduced in size in order to increase its number, it is difficult to reduce the size of the TFT and its wiring in each pixel. The ratio of the pixel open area (open area ratio) gets lower as the area of a pixel is reduced for increased number of the pixels. Therefore, in order to keep the luminance of the screen even when the open area ratio is reduced, it is necessary to increase the amount of the light from the light source device.

Thus, the light source device of a liquid crystal display apparatus for a liquid crystal projector and an image display emits more and more amount of the light. However, when the light emitted from light source device increases, the light irradiating on the TFTs and their wirings increases accordingly, so that carriers are prone to be excited by the light, which may lead to unstable operation or malfunction of the TFT.

In order to improve the efficiency of the light while suppressing the increase in the light supplied from the light source device, a lens array is provided on the back substrate. FIG. 3 is a cross-sectional view that schematically shows the liquid crystal display panel 41 provided with a lens array 47 on a back substrate 42. In the back substrate 42 of the liquid crystal display panel 41, lens-shaped patterns are formed on the surface of a lens resin layer 45 formed on the glass substrate 44, then a sealing resin layer 46 is applied on the lens resin layer 45 to make a planer surface. The lens resin layer 45 and the sealing resin layer 46 have different refractive indexes, thus forming a lens array 47 at the interface of the lens resin layer 45 and the sealing resin layer 46. Furthermore, a cover substrate 64 made from glass is adhered to the sealing resin layer 46, a transparent electrode (ITO) 48 is formed to cover the all surface of the cover substrate 64, and an orientation film 49 is provided on the surface of the transparent electrode 48. On the back substrate 42, a surface substrate 43 is adhered via a liquid crystal layer 51 the peripheral of which are sealed by a spacer 50. In the front substrate 43, color filters 53 and black matrixes 54 are formed on the back surface of a glass substrate 52, pixel electrodes 55 and TFTs 56 are formed on the color filters 53 and the black matrixes 54, and an orientation film 57 is formed on the pixel electrodes 55 and TFTs 56. On the surface of the front substrate 43 and the back surface of the back substrate 42, polarizing plates 58 and 59 are disposed.

In the liquid crystal display panel 41, the light emitted from the light source device and incident on the back substrate 42, when passing through the lens array 47 as shown in FIG. 4, is collected to each pixel opening 60 (pixel electrode 55 and color filter 53) by the lens array 47, to pass through the opening 60. As a result, the light emitted from the light source is not blocked by the black matrixes 54, instead, almost 100% of the light passes through the pixel opening 60 to exit in forward direction, which significantly improves the efficiency of the light. Also, as the light passed through the lens array 47 is collected to the pixel opening 60, the light is less likely to enter the TFTs 56 or their wirings, which prevents unstable operation or malfunction of the TFTs 56.

However, the lens array is difficult to be formed in an ideal shape. The boundary edge between lenses constituting the lens array may be rounded, so that, the light passed through the lens array irradiates on the TFTs and the TFT wirings in practice. It is difficult to satisfactorily prevent unstable operation or malfunction of the TFTs.

In order to solve the above problem, an improved liquid crystal display panel 61 has a cover substrate 62 made from glass on the sealing resin layer 46 of the back substrate 42, as shown in FIG. 5. Furthermore, light blocking members 63 (these may be sometimes referred to as black matrixes) are provided between the cover substrate 62 and above transparent electrode 48 at the positions corresponding to the boundary edges of the lens array 47, to prevent light from irradiating on the TFTs 56.

The liquid crystal display panel illustrated in FIG. 5 has features to minimize the amount of light irradiating on the TFTs to prevent unstable operation or malfunction of the TFTs. The blocking member used to block incident light on the TFTs is made from a Cr (chrome) single layer film (the reflectance is around 60%) having low reflectance.

A light blocking member made from a material having low reflectance has high light absorptance at the same time. In a liquid crystal display panel having a structure as shown in FIG. 5, the blocking member raises its temperature by the light emitted from the light source device, which causes the rise in the temperature of the liquid crystal display panel as a whole. This rise in the temperature affects the liquid crystal and the orientation film, and the quality and the life of the liquid crystal display panel itself. When the temperature of the liquid crystal display panel reaches 60 to 70 degrees centigrade, the liquid crystal may decompose or the characteristics of the orientation film may change, which leads to the change in the orientation of the liquid crystal, then deterioration of the liquid crystal display panel. Particularly in recent years, as the pixel in the liquid crystal display panel gets finer as described, the black matrixes and the blocking members occupy wider area than ever, and more amount of light is emitted to improve the luminance of the liquid crystal display panel. The rise in temperature of the liquid crystal display panel imposes a big problem.

The purpose of the present invention is to solve the above problem. The present invention provides a lens array substrate and a liquid crystal display apparatus which can prevent unstable operation and malfunction of the elements such as TFT, by suppressing the rise in the temperature of the liquid crystal display panel.

SUMMARY OF THE INVENTION

The invention provides a lens array substrate having a lens array made from a plurality of lenses, wherein light blocking members are provided along the regions corresponding to the boundaries between the lenses, and the surface of the light blocking member on which the light is incident has high reflectance against light. Typically, the high reflectance surface has reflectance of 70% or more, more preferably, 80 to 90% or more reflectance against light. The surface of the light blocking members opposite to this high reflectance surface may have either high reflectance, high light absorptance, high diffusivity, or any other characteristics.

The lens array substrate according to the invention can collect the incident light by each lens in the lens array. Also, as the blocking members are provided along the regions corresponding to the boundaries between the lenses, they can effectively block the light passed through these boundaries. The lens boundaries may have molding error or rounded edge, so that the light can pass through these edges. But according to the invention, the light thus passed is prevented from diffusing to irregular direction. In addition, the light incident surface of the light blocking member has such high reflectance so that it is not prone to absorb the blocked light nor to raise its temperature, which minimizes the rise in temperature of the lens array substrate.

According to an embodiment of the invention, the light blocking member is formed with Al or Ag, which makes a high reflectance surface. It facilitates the handling of the light blocking member, also reduces the cost. Especially, when Ag is used, the reflectance as high as about 98% can be obtained.

According to another embodiment of the invention, at least one component which is contained in the member adjacent to the light blocking member is added therein. Thus, the component contained in the adjacent member cannot diffuse to the light blocking member, which prevents the change in the quality of light blocking member and improves the reliability of lens array substrate. For example, when the blocking member is adjacent to the glass surface, Si may be added to the light blocking member. When the adjacent member comprises mainly of Al, Al—Si—Cu or Al—Si may be used for the light blocking member.

According to another embodiment of the invention, a layer to improve the adhesion of the light blocking member supporting member and the light blocking member itself, is interposed therebetween. This construction prevents the light blocking member from separating from its supporting member, to improve the reliability of the lens array substrate.

According to another embodiment of the invention, the light exiting surface of the light blocking member has high light absorptance, i.e., the light incident surface of the light blocking member has high reflectance while the light exiting surface of it has high light absorptance. Thus, when the light passed through the lens array substrate is reflected, the light blocking member can effectively absorb the returned light. That is, the light blocking member can prevent the light from being re-reflected by the light blocking member and becoming stray light.

In order to obtain high light absorptance in the light exiting surface of the light blocking member, the surface may be formed with Cr, an oxide (for example, chrome oxides) or polymers. The surface formed with a chrome oxides has higher light absorptance compared to the surface formed with Cr. Otherwise, a chrome oxide can be formed on the Cr surface. When the surface is made from a polymer, the surface with high light absorptance can be formed in ambient atmosphere at room temperature. When a photosensitive polymer such as photosensitive polyimide is used as a polymer, a surface with high light absorptance can be formed by the photolithography.

According to another embodiment of the invention, a light blocking member has an etching stop layer between a layer constituting the high reflectance surface and a layer constituting the high light absorptance surface. In this embodiment, when etching for patterning the upper layer of the layer constituting the high reflectance surface and the layer constituting the high light absorptance surface, the etching stop layer prevents the lower layer from being etched. Thus, the lower layer can be prevented from being over-etched and having too narrow pattern width by side-etching.

According to another embodiment of the invention, the layer constituting the high light absorptance surface may be formed on the glass surface oriented to the incident light, and the layer constituting the high reflectance surface is formed on the high light absorptance surface. That is, when the light blocking member having the high reflectance surface and the high light absorptance surface is formed on the glass surface oriented to the incident light, the layer constituting the high light absorptance surface is adhered to the glass surface. For example, a Cr layer constituting the high light absorptance surface adheres to the glass more securely than an Al layer constituting the high reflectance surface. Therefore, the light blocking member formed on the glass surface oriented to the incident light can adhere to the glass surface more securely with a simple construction.

In the liquid crystal display apparatus according to the invention, the lens array substrate and the opposite substrate recited in one of the claims 1 to 12 are disposed in opposite side via a liquid crystal layer, pixel electrodes are formed in one of the lens array substrate or the opposite substrate, in opposite positions of each lens in the lens array, and a transparent electrode is formed on the other of the lens array substrate or the opposite substrate.

The liquid crystal display apparatus according to the invention collects the incident light to the pixel electrodes by each lens in the lens array, which improves the efficiency of the light. Also, as the light blocking members are provided along the regions corresponding to the boundaries of the lenses, the light passed through these boundaries can be effectively blocked by the light blocking members, which prevents the light passed through the molding error or rounded edge of the lens boundary from entering in the element such as TFTs. Any unstable operation of the elements caused by the light thus entered can be effectively prevented. Furthermore, the light incident surface of the light blocking member has such high reflectance that it is not prone to absorb the blocked light nor raise its temperature, which minimizes the rise in the temperature of the liquid crystal display apparatus.

The components as described above can be combined in any way as desired.

BRIEF DESCRIPTION OF THE DRAWING

FIGS. 34A to 34G are cross-sectional views that illustrate another manufacturing process of a back substrate used in the liquid crystal display panel shown in FIG. 32A.

DESCRIPTION OF THE PREFERRED EMBODIMENT

First Embodiment

Figure 1:
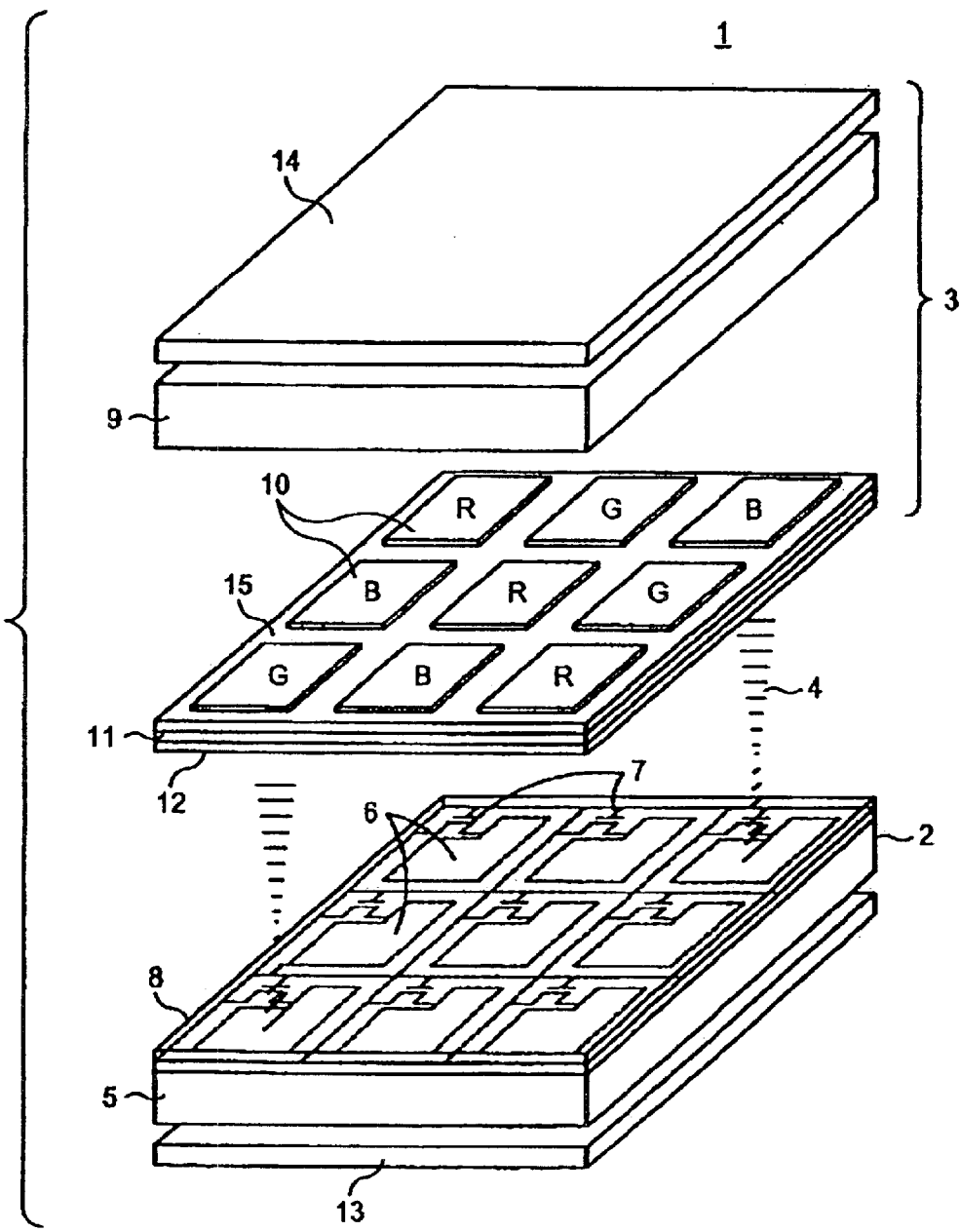
FIG. 1 is an exploded perspective view that schematically shows an inner structure of a liquid crystal display panel.
Figure 2:
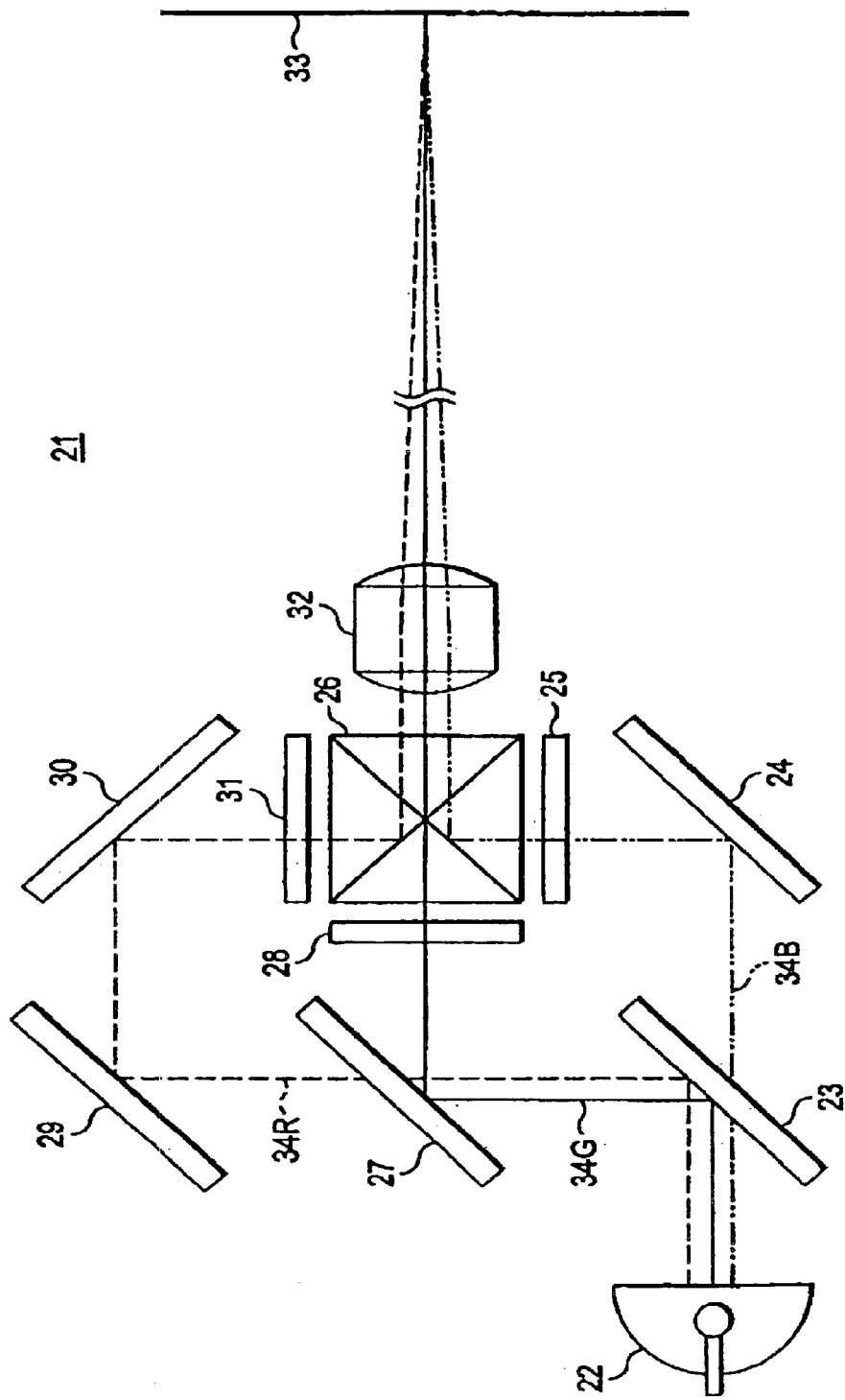
FIG. 2 is a view that illustrates a construction of a color liquid crystal projector.
Figure 3:
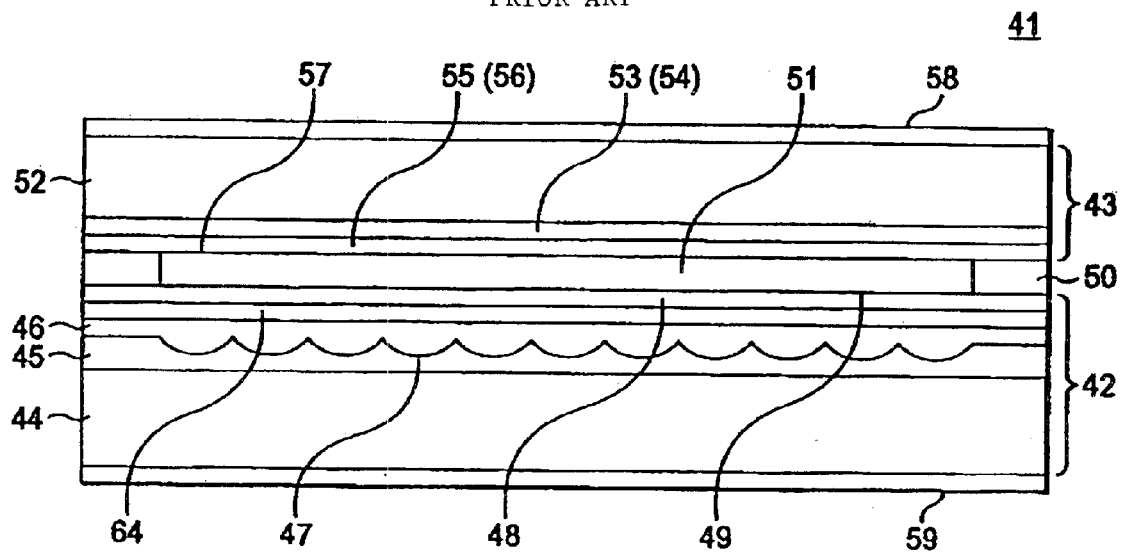
FIG. 3 is a cross-sectional view that schematically shows a construction of a conventional liquid crystal display panel provided with a lens array on the back substrate.
Figure 4:
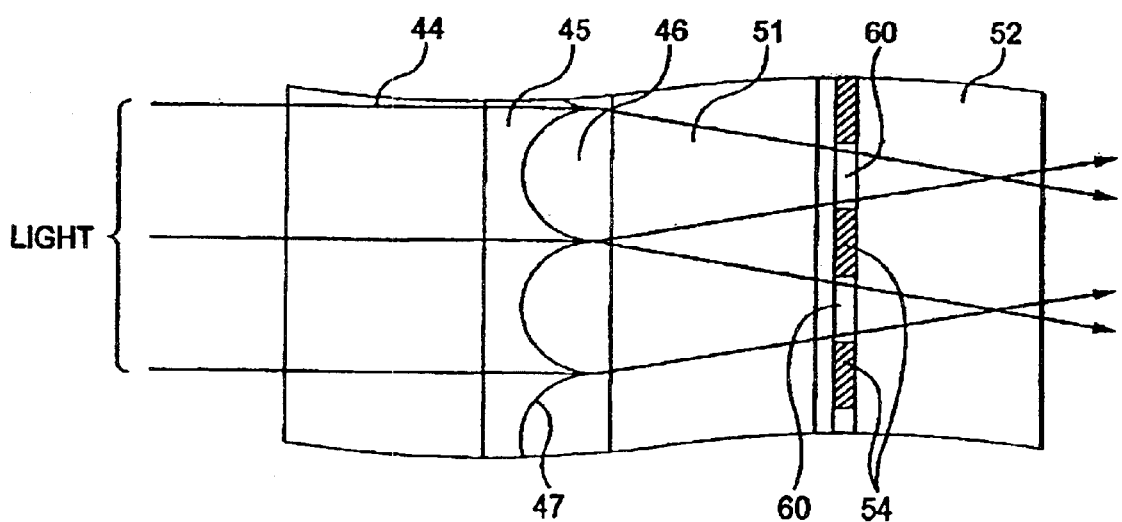
FIG. 4 is a view that illustrates function of the lens array of FIG. 3.
Figure 5:
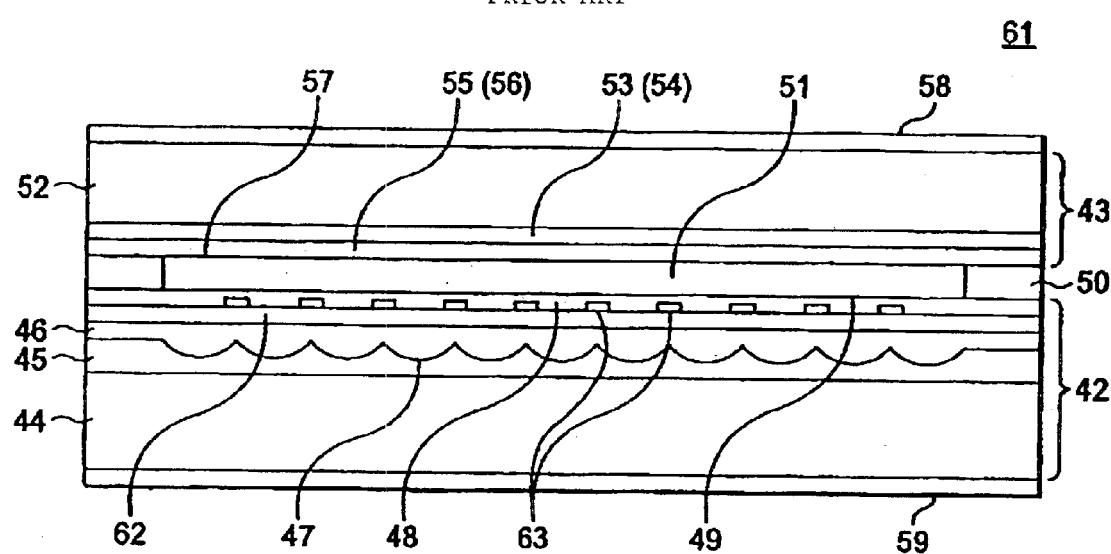
FIG. 5 is a cross-sectional view that schematically shows a construction of a conventional liquid crystal display panel provided with a light blocking member in front of the lens array.
Figure 6A:
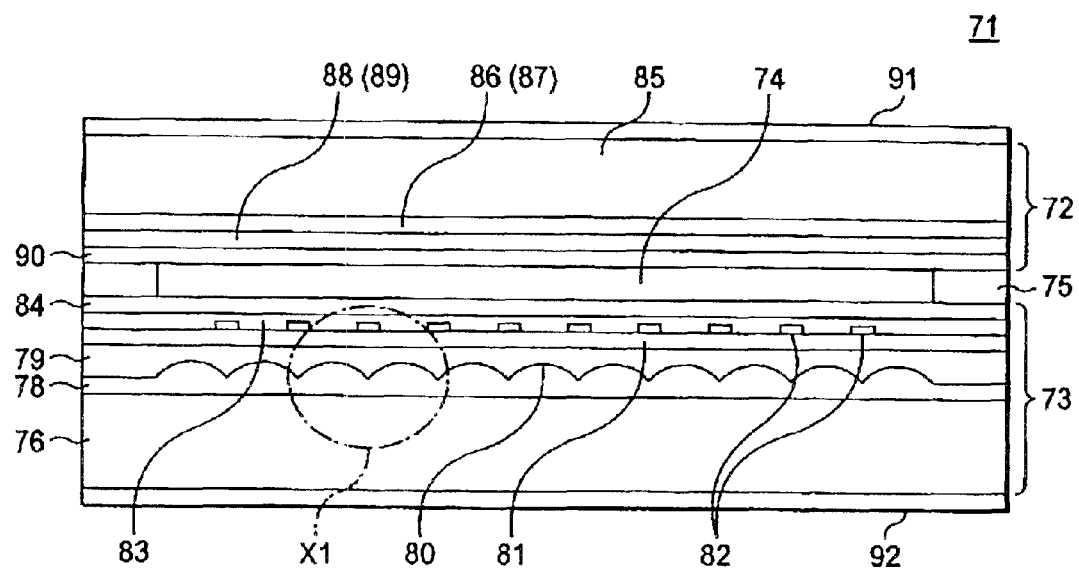
FIG. 6A is a cross-sectional view that schematically shows a construction of a liquid crystal display panel according to an embodiment of the invention.
Figure 6B:
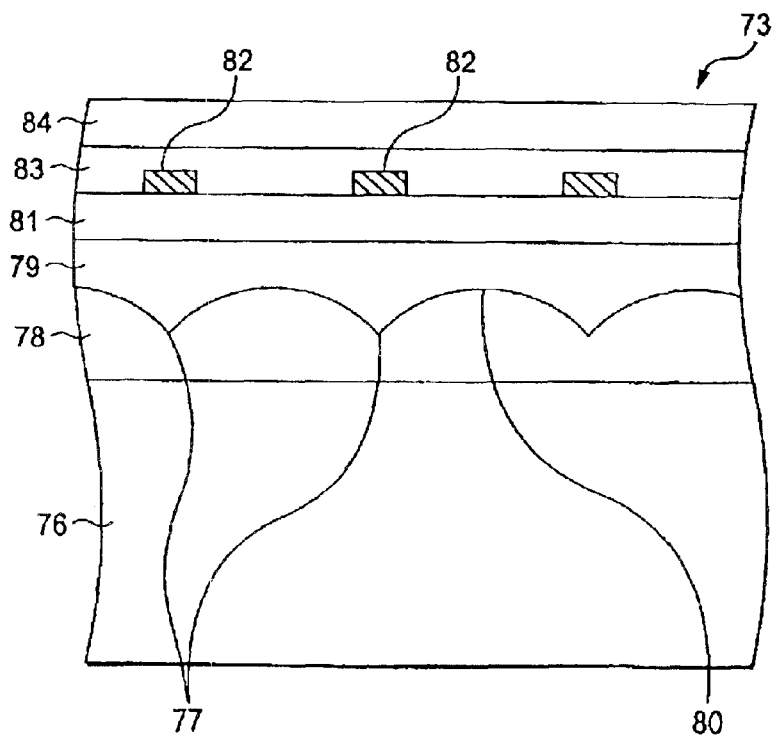
FIG. 6B is an expanded view of the X1 portion of FIG. 6A.

FIG. 6A is a cross-sectional view which schematically shows a construction of a liquid crystal display panel according to an embodiment of the invention. FIG. 6B shows an expanded view of the X1 portion of FIG. 6A. This liquid crystal display panel 71 is provided with a light source device (back light) on its back, and the liquid crystal display panel itself may be used as a liquid crystal projector having a construction shown in FIG. 2, or a liquid crystal display in a PDA such as mobile telephone and a personal computer.

Figure 7:
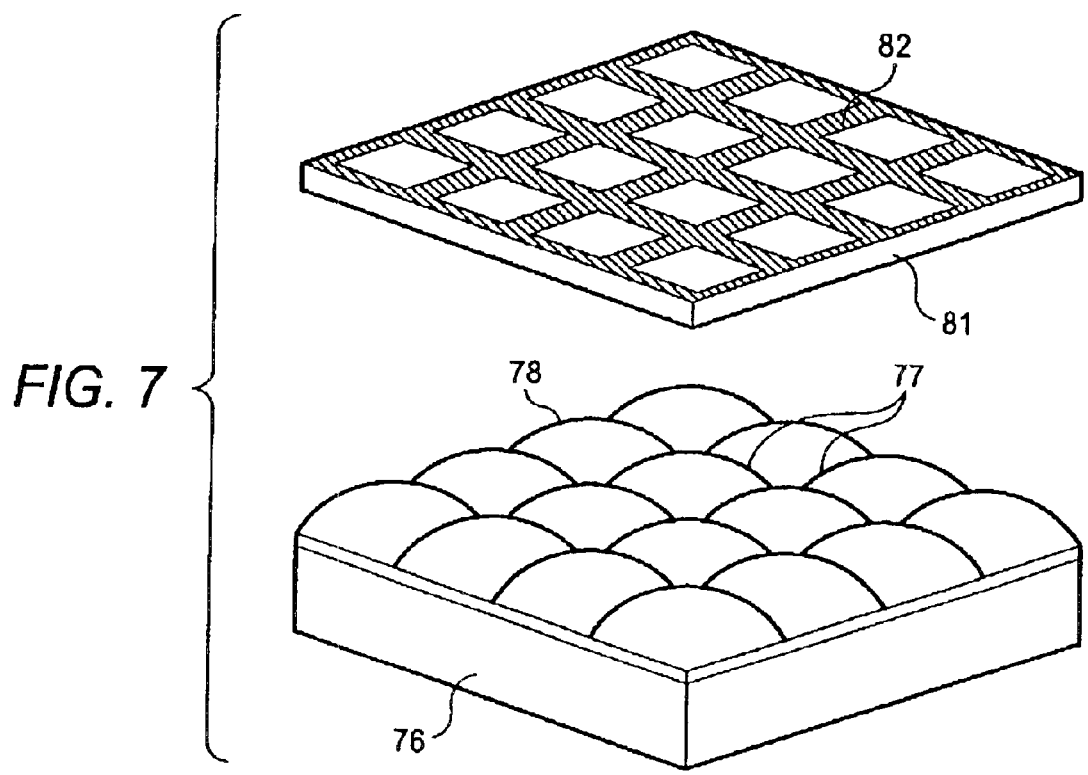
FIG. 7 is a perspective view that illustrates the correspondence between the boundary edges of the lens array and the light blocking members arranged in a lattice, in the liquid crystal display panel shown in FIG. 6A.

In the liquid crystal display panel 71, a liquid crystal layer 74 is interposed between a front substrate (opposite substrate) 72 and the back substrate (lens array substrate) 73, and the periphery of the liquid crystal layer 74 is sealed with a spacer 75. In the back substrate 73, lens-shaped patterns are formed on the surface of the transparent lens resin layer 78 formed on a glass substrate 76, and a sealing resin layer 79 made from a transparent resin having different refractive index than that of a lens resin layer 78 is applied on the lens resin layer 78 to make a planar surface. Thus, a lens array 80 is formed at the interface of the lens resin layer 78 and the sealing resin layer 79 which have different refractive indexes from each other. Furthermore, a cover substrate 81 made from glass is laid on the sealing resin layer 79, and light blocking members 82 are formed on the cover substrate 81. As shown in FIG. 7, the light blocking members 82 are patterned in a lattice along the boundary edges 77 between lenses in the lens array 80, and the members 82 are made from a material with high reflectance, for example a metal material having 65% or more reflectance such as Al (aluminum). A transparent electrode 83 such as ITO is formed on the whole surface of the cover substrate 81 via the light blocking members 82, and the light blocking members 82 are interposed between the transparent electrode 83 and the cover substrate 81. An orientation film 84 is provided on the surface of the transparent electrode 83.

In the surface substrate 72, color filters 86 and black matrixes 87 are formed on the back surface of the glass substrate 85, pixel electrodes 88 and TFTs 89 (including TFT wirings) are formed on the color filter 86 and the black matrixes 87, then, an orientation film 90 is formed on the pixel electrodes 88 and the TFTs 89. On the surface of the front substrate 72 and the back surface of the back substrate 73, polarizing plates 91 and 92 are disposed, respectively.

Figure 8:
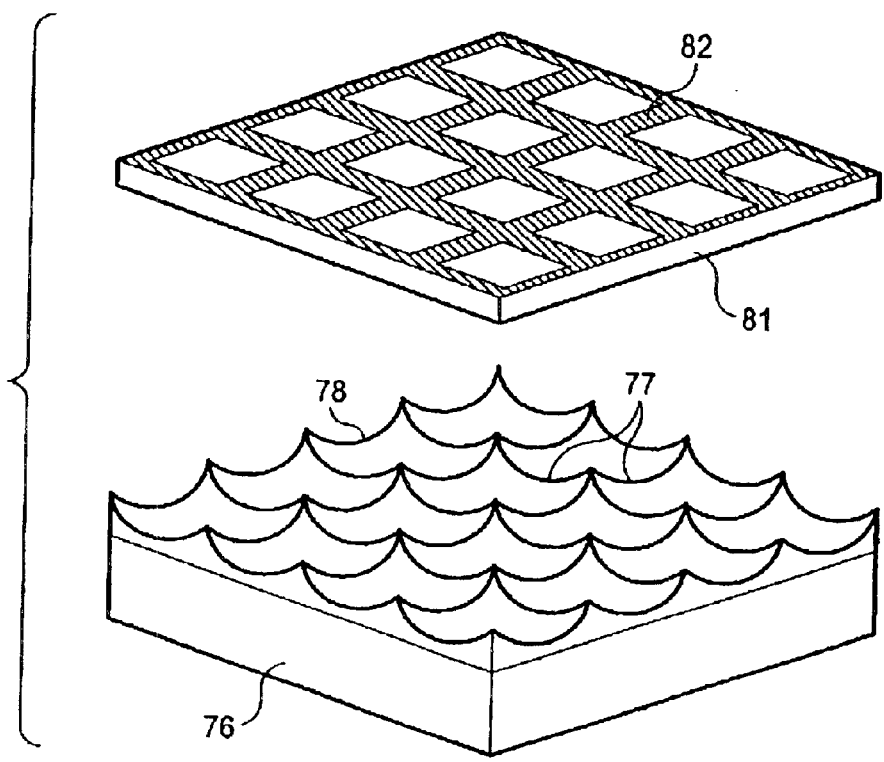
FIG. 8 is a perspective view that illustrates the correspondence between the boundary edges of the concave lens array and the light blocking members arranged in a lattice.

As shown in FIG. 7, in this embodiment, the lens resin layer 78 shaped in convex is formed on the glass substrate 76. However, as shown in FIG. 8, a lens resin layer 78 shaped in concave may be formed on the glass substrate 76, and light blocking members 82 may be formed in opposite positions along the boundary edges 77 between lenses in the concave lens array 80. Also, a resin which can be used for the lens resin layer 78 and the sealing resin layer 79 may be either a photo-curing (UV curing) resin or a thermosetting resin.

Figure 9:
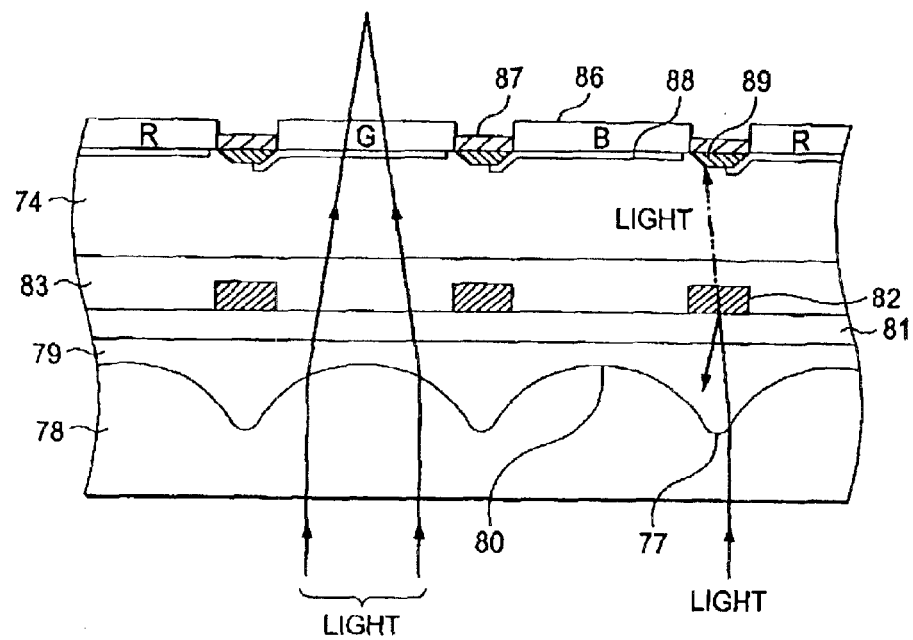
FIG. 9 is a view that illustrates the function of the liquid crystal display panel shown in FIG. 6A.

In the liquid crystal display panel 71, as shown in FIG. 9, the light emitted from the light source device and incident into the back substrate 73 is collected by the lens array 80 to the pixel opening comprising the pixel electrodes 88 and the color filters 86 and transmits the pixel opening, which improves the efficiency of the light from the light source device, as well as prevents the light from irradiating on the TFTs 89 and their wirings. The light blocking members 82 are disposed between the lens array 80 and the TFTs 89. Furthermore, as these light blocking members 82 are disposed opposite to the TFTs 89 and their wirings, when the boundary edge 77 of the lens array 80 is rounded as shown in FIG. 9, the light proceeding to the TFT 89 is reflected by the light blocking members 82. Thus, as shown in the dash-dot line in FIG. 9, it is difficult for the light to irradiate on the TFTs 89. Therefore, this construction of the liquid crystal display panel 71 effectively prevents the TFTs 89 from getting into unstable operation and malfunction.

The light blocking member 82 has such high reflectance that it is not prone to absorb the light nor raise its temperature, which suppresses rise in temperature of the liquid crystal display panel 71 itself. This construction thus prevents failures such as decomposition of the liquid crystal or deterioration of the orientation film caused by the rise in temperature of the liquid crystal display panel 71.

Figure 10:
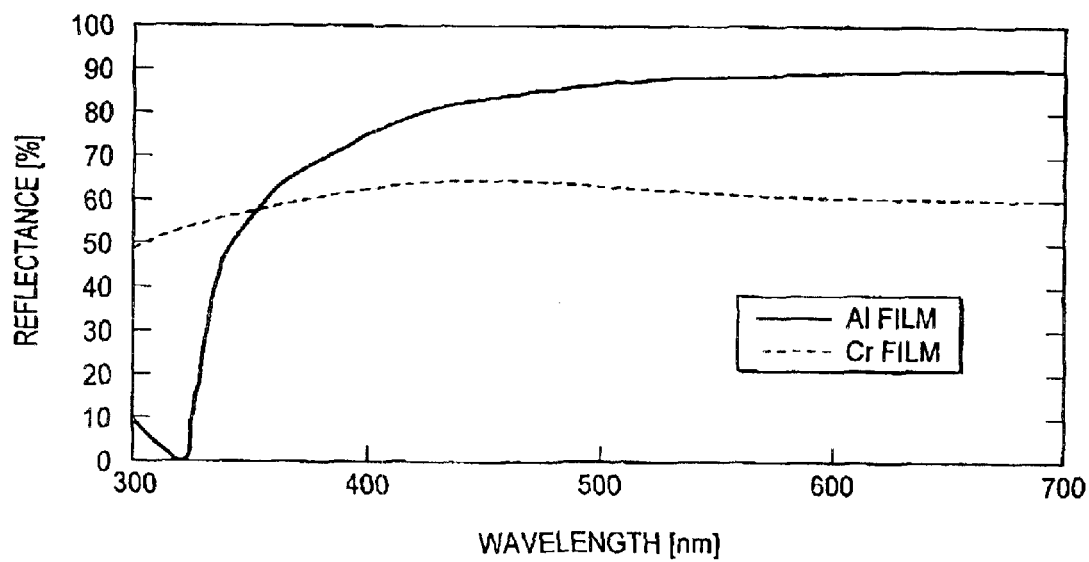
FIG. 10 is a graph which illustrates the relationship between the wavelength of light in the range of 300 nm to 700 nm and the reflectance of the Al and Cr.

Next, we will discuss a Cr film as a blocking member having high light absorptance (conventional example), and an Al film as a blocking member having high reflectance (the invention), for a comparison. FIG. 10 plots the wavelength of the light and the reflectance of the Al and Cr, respectively, in the wavelength ranging from 300 to 700 nm. As can be seen in FIG. 10, Cr has about 60% of the reflectance in a longer wavelength range which contributes the rise in temperature. On the contrary, Al has about 90% of the reflectance in the same range.

Figure 11:
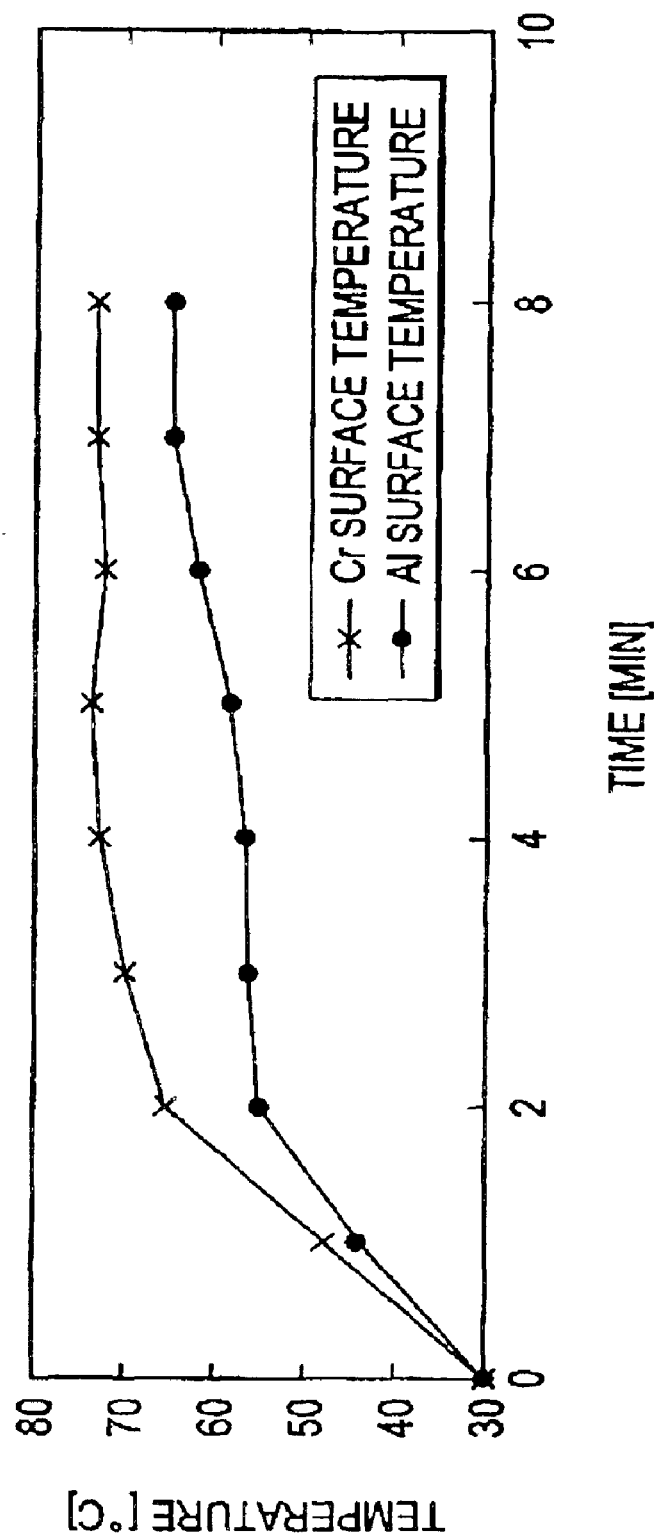
FIG. 11 is a graph that illustrates the relationship between the temperature on the surface of the Cr film or the Al film formed on the substrate and the duration of the illumination of a lamp.

Next, the light from a lamp is irradiated on the all surface of the substrate covered with a Cr film, to obtain the relationship between the duration of the irradiation (0 to 10 minutes) and the surface temperature of the Cr film (change in the surface temperature over time). Similarly, the light from a lamp is irradiated on the all surface of the substrate covered with an Al film to obtain the relationship between the duration of the irradiation (0 to 10 minutes) and the surface temperature of the Al film. The light emitted from a 150 W lamp is irradiated on the Cr film and the Al film via optical system for a projector. FIG. 11 shows the result of this experiment. In FIG. 11, the horizontal axis indicates the duration of the irradiation (minutes), while the vertical axis indicates the surface temperature (degrees centigrade) of the Cr film and the Al film. As can be seen from FIG. 11, the light blocking member comprising a Cr film has surface temperature higher than that comprising a Al film with high reflectance, by about 10 degrees centigrade. This results indicates that, a blocking member having high reflectance can suppress the rise in the temperature of the light blocking member, thus prevent the rise in the temperature of the liquid crystal display panel itself.

Figure 12A:
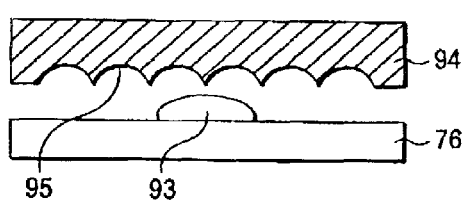
FIGS. 12A to 12H are cross-sectional views that illustrate manufacturing processes of a back substrate used in the liquid crystal display panel shown in FIG. 6A.
Figure 12B:
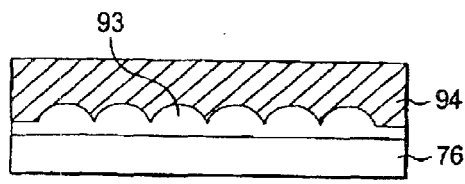

Next, the manufacturing process of the back substrate 73 of the liquid crystal display panel 71 will be described. FIGS. 12A to 12H show the manufacturing process of the back substrate 73 using the photo-polymer method (two P method). In this process, predetermined amount of an UV curing resin 93 is dropped on the glass substrate 76 of about 1 mm thickness (FIG. 12A), and a stamper 94 is pressed onto the glass substrate 76 via the UV curing resin 93, to spread the UV curing resin 93 in the gap between the stamper 94 and the glass substrate 76 (FIG. 12B). The stamper 94 has patterns 95 which are the reverse of the lens array pattern, on its lower surface, so that, when the UV curing resin 93 is interposed between the stamper 94 and the glass substrate 76, the UV curing resin 93 adheres to the surface of the glass substrate 76, and the patterns of the lens array 80 are transferred to the surface of the UV curing resin 93 by the reversed patterns 95.

Figure 12C:
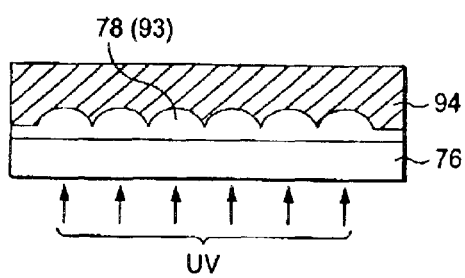
Figure 12D:
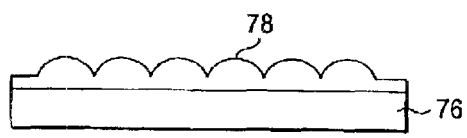
Figure 12E:
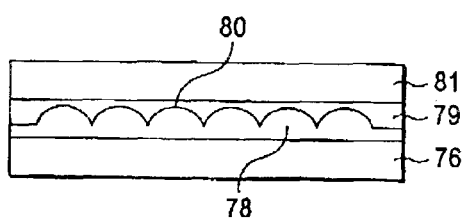
Figure 12F:
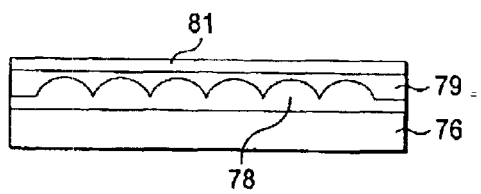

Next, UV (UV beam) is irradiated on the UV curing resin 93 via the glass substrate 76. The UV curing resin 93 is photo-cured (FIG. 12C). When removing the stamper 94, a lens resin layer 78 of several tens $\mu$m thickness is formed on the glass substrate 76 (FIG. 12D). Then, a thick cover substrate 81 is adhered via a high refractive index resin (adhesive) having a different refractive index from the lens resin layer 78, to form a sealing resin layer 79 of several tens $\mu$m thickness having the high refractive index (FIG. 12E). After that, the upper surface of the cover substrate 81 is ground to a desired thickness (for example, several $\mu$m to several tens $\mu$m) (FIG. 12F).

Figure 12G:
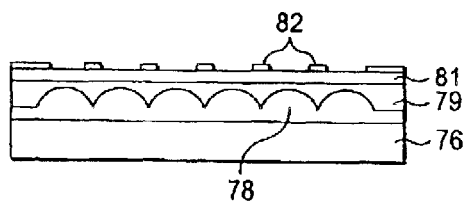
Figure 12H:
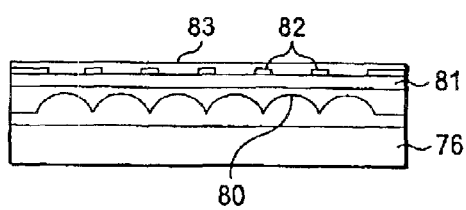

Next, a metal material having high reflectance such as Al is deposited on the all the surface of the cover substrate 81 which became thinner by grinding, to form a film of blocking members 82 of several hundreds to several thousands Å thickness. There is no restriction on the method to form a film of the blocking members 82 made from Al, however, the vacuum deposition method, the sputtering or the CVD method may be applicable. After that, photoresist patterns are formed on the light blocking members 82 by the photolithography, a part of the light blocking members 82 is removed by etching via the photoresist patterns, to make lattice patterns on the light blocking members 82 (FIG. 12G). The applicable etching methods include a dry-etching by semiconductor plasma such as the reactive ion etching (RIE) and the sputter-etching, or a wet-etching using a mixed solution of phosphoric acid, nitric acid and acetic acid, for example. Next, a transparent electrode 83 comprising ITO having about 1500 Å thickness is formed on the all surface of the cover substrate 81 via the blocking members 82 (FIG. 12H) by a film forming method such as vacuum deposition, the sputtering, or the CVD method, then an orientation film 84 is formed on the transparent electrode 83.

Figure 13A:
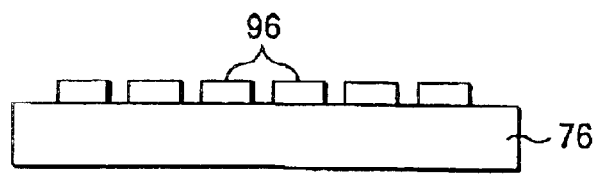
FIGS. 13A to 13G are cross-sectional views that illustrate another manufacturing processes of a back substrate used in the liquid crystal display panel shown in FIG. 6A.
Figure 13B:
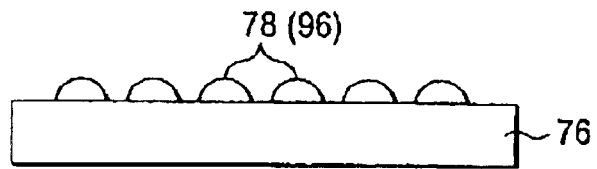
Figure 13C:
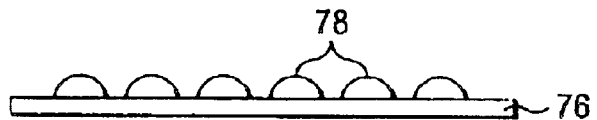

FIGS. 13A to 13G show another manufacturing process of the back substrate 73 which uses a dry-etching method. In this manufacturing process, a resist 96 is applied on the glass substrate 76. The resist 96 is applied like separated islands on the positions on the surface of the glass substrate 76 each of which is corresponding to the position of each lens in the lens array 80 (FIG. 13A). Next, the glass substrate 76 having resists 96 thereon is post-baked at high temperature. The resists 96 are melt to form lens shapes by the surface tension of their own. The resists 96 are left intact to cool down, to form a lens resin layer 78 (FIG. 13B).

Figure 13D:
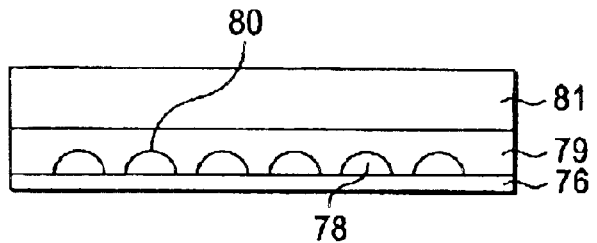
Figure 13E:
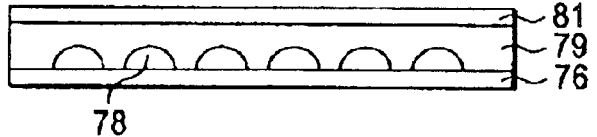

Next, the thickness of the glass substrate 76 is reduced by dry-etching the glass substrate 76 from its back surface (FIG. 13C), and a cover substrate 81 is adhered to the glass substrate 76 and the lens resin layer 78 via a sealing resin layer 79 (adhesive of high refractive index resin) (FIG. 13D). Next, the upper surface of the cover substrate 81 is ground to the desired thickness (FIG. 13E).

Figure 13F:
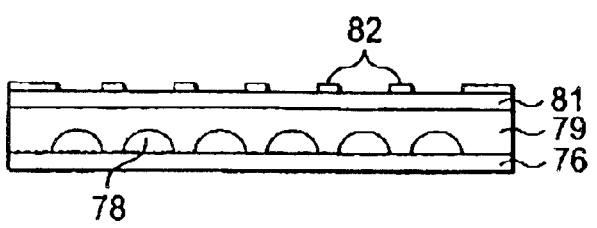
Figure 13G:
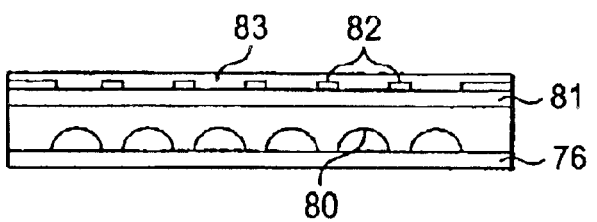

A film of the light blocking member 82 is formed by depositing a metal material having high reflectance such as Al, on the all surface of the cover substrate 81 which became thinner by the grinding. A part of the light blocking member 82 is removed by the photolithography and the etching, to make lattice patterns (FIG. 13F). Then, a transparent electrode 83 made from ITO is formed on the all surface of the cover substrate 81 via the light blocking members 82 (FIG.

13G), then, an orientation film 84 is formed on the transparent electrode 83.

The back substrate 73 having a concave lens array 80 as shown in FIG. 8 can be manufactured similarly by the photo-polymer method. Also, the wet-etching shown in FIGS. 14A to 14H may be used for manufacturing such a substrate 73. However, in this manufacturing process, the lens resin layer is not used. Instead, lens array patterns are directly formed on the upper surface of the glass substrate 76, and the lens array 80 is formed at the interface of the sealing resin layer 79 formed on the glass substrate 76, and the glass substrate 76.

Figure 14A:
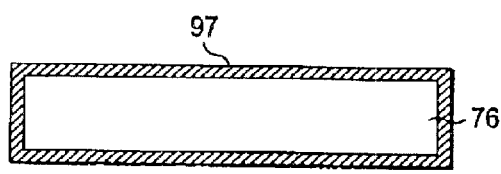
FIGS. 14A to 14H are cross-sectional views that illustrate another manufacturing processes of a back substrate used in the liquid crystal display panel shown in FIG. 6A.
Figure 14B:
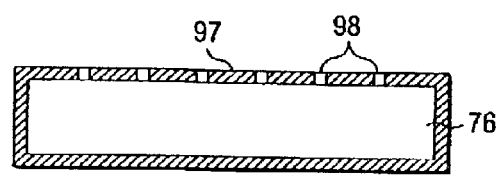
Figure 14C:
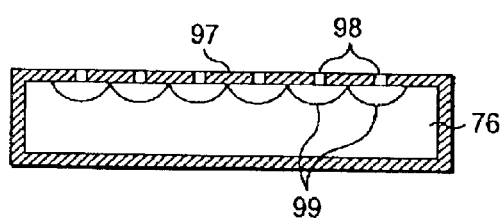
Figure 14D:
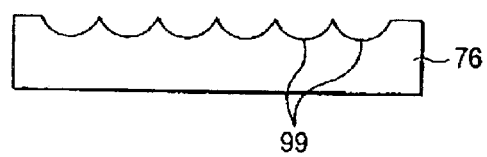

In this method, the surface of the glass substrate 76 is covered with a protective film 97 made from poly-Si (FIG. 14A). Then, relatively small openings 98 are formed on the protective film 97 at the positions on which lenses in the lens array 80 is to be formed respectively, by using a photolithography method (FIG. 14B). When the glass substrate 76 is wet-etched via the openings 98, the glass substrate 76 is isotropically etched around the openings 98 to form concave lens-shaped recesses 99 under each opening 98 (FIG. 14C).

Figure 14E:
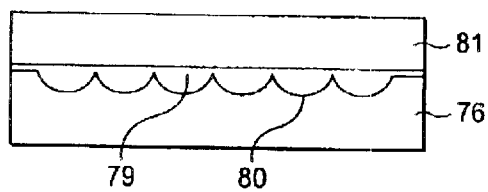
Figure 14F:
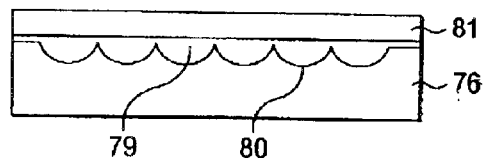

After removing the protective film 97 on the surface of the glass substrate 76 (FIG. 14D), the thick cover substrate 81 is adhered to the upper surface of the glass substrate 76 via the sealing resin layer 79 (adhesive of high refractive index resin) (FIG. 14E). Next, the upper surface of the cover substrate 81 is ground to the desired thickness (FIG. 14F).

Figure 14G:
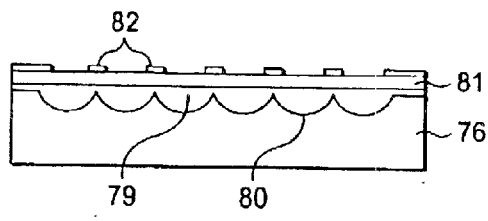
Figure 14H:
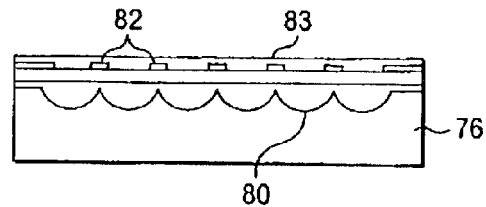

A film of the light blocking member 82 is formed by depositing a metal material having high reflectance such as Al, on the all surface of the cover substrate 81 which became thinner by the grinding. A part of the light blocking member 82 is removed by the photolithography and the etching, to make lattice patterns (FIG. 14G). Next, a transparent electrode 83 made from ITO is formed on the all surface of the cover substrate 81 via the light blocking member 82 (FIG. 14H), then, an orientation film 84 is formed on the transparent electrode 83.

In Case of the Ag Light Blocking Member

In the above described embodiment, Al is used for the light blocking member 82 having high reflectance. However, the material for the light blocking member 82 is not limited to the Al. For example, Ag (silver) may also be applicable. The thickness of the film of the light blocking member 82 using Ag may be about several hundreds to several thousands Å. When Ag (silver) is used as the light blocking member 82, the reflectance of about 98% can be obtained, which is higher than that of Al.

When Ag is used for the blocking member 82, the back substrate 73 can be manufactured in a process similar to the above described process. In this case, the electrolytic plating and the non-electrolytic plating in addition to the vacuum deposition, the sputtering and the CVD method, can be used to form a film of the light blocking member 82 on the cover substrate 81. In etching the blocking member thus manufactured, a dry-etching such as the RIE method and the sputter-etching, as well as a wet-etching using Ag etching solution can be applicable. Otherwise, the blocking member 82 can be formed in desired patterns by the liftoff method.

In Case of Al—Si—Cu Blocking Member

A metal material with high reflectance to which at least Si is added, such as Al—Si—Cu (Si and Cu added Al) and Al—Si (Si added Al), can be used for the light blocking member 82 with high reflectance. The thickness of the film of the light blocking member 82 made from Al—Si—Cu or Al—Si may be about 1000 Å, for example. The light blocking member 82 made from Al—Si—Cu or Al—Si adheres to the cover substrate 81 more securely than that made from only Al, while maintaining comparable reflectance. When Al is used for the light blocking member 82, Si diffuses from the cover substrate 81 (glass) to the light blocking member 82 made from Al, which changes the quality of the light blocking member 82. On the contrary, when Al to which at least Si is added, such as Al—Si—Cu or Al—Si is used for the light blocking member 82, Si cannot diffuse from the cover substrate 81 to the light blocking member 82. This prevents change in the quality of the light blocking member 82 and improves the reliability of the back substrate 73 and the liquid crystal display panel 71.

When using Al—Si—Cu or Al—Si, the film can be formed by the vacuum deposition, the sputtering or the CVD method. Also, when making patterns by etching on the blocking member made from Al—Si—Cu or Al—Si, a dry-etching such as the RIE method and the sputter-etching, or a wet-etching using a mixed solution of phosphoric acid, nitric acid and acetic acid may be similarly applicable.

Second Embodiment

Figure 15A:
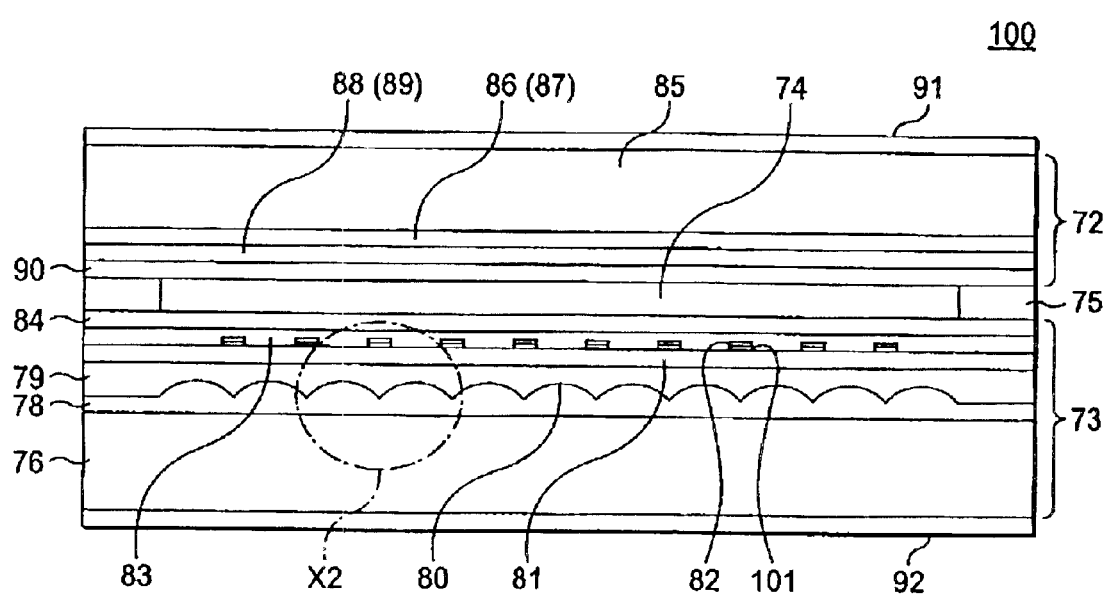
FIG. 15A is a cross-sectional view which schematically shows a construction of a liquid crystal display panel according to another embodiment of the invention.
Figure 15B:
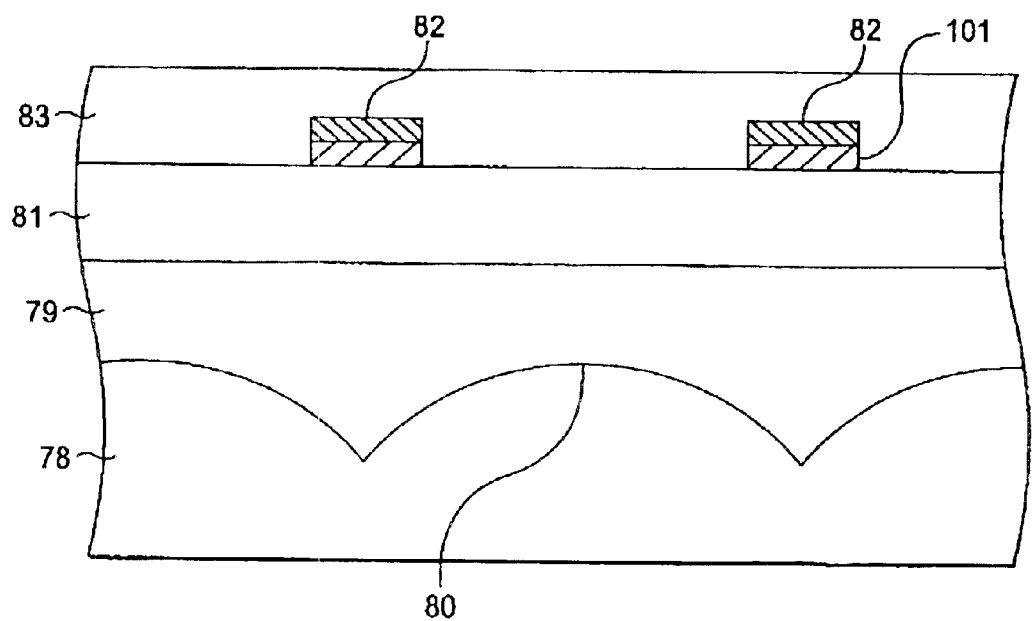
FIG. 15B is an expanded view of the X2 portion of FIG. 15A.

FIG. 15A is a cross-sectional view which schematically shows the liquid crystal display panel 100 according to another embodiment of the invention, and FIG. 15B is an enlarged view of the X2 potion in FIG. 15A. The liquid crystal display panel 100 has a construction similar to that of the liquid crystal display panel 71 shown in FIG. 6A. However, in the liquid crystal display panel 100 shown in FIG. 15A, a $SiO_2$ layer 101 of about 100 to 200 Å thickness is provided under the light blocking member 82 made from a material having high reflectance such as Al, Ag, Al—Si—Cu and Al—Si.

When the light blocking member 82 is provided on the cover substrate 81 via the $SiO_2$ layer 101, as in the liquid crystal display panel 100, the light blocking member 82 can adhere to the cover substrate 81 more securely when it is adhere to the cover substrate 81 via $SiO_2$ layer 101 than when it is adhere to the cover substrate 81 directly, due to good adhesion of the $SiO_2$ layer 101. As a result, the separation of the light blocking member 82 is prevented.

Also as the $SiO_2$ layer is transparent, the light incident on the light blocking member 82 passes through the $SiO_2$ layer 101 and is reflected by the light blocking member 82. Therefore, even if the $SiO_2$ layer 101 is provided under the light blocking member 82, the function of the light blocking member 82 is not impaired, and the incident light can be reflected effectively by the light blocking member 82.

The liquid crystal display panel 100 having this construction can be manufactured in processes similar to those for the liquid crystal display panel 71 according to the first embodiment (see FIGS. 12 to 14). However, as the $SiO_2$ layer 101 is provided under the light blocking member 82, some modification is necessary to form a film of the light blocking member 82.

Figure 16A:
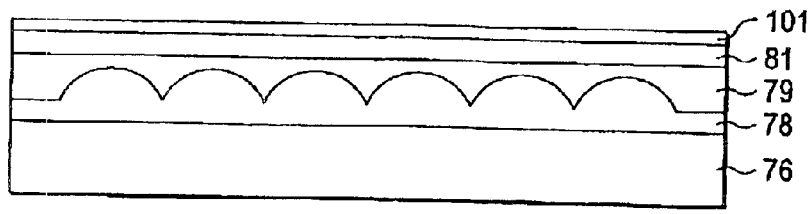
FIGS. 16A to 16E are cross-sectional views that illustrate manufacturing processes of a back substrate used in the liquid crystal display panel shown in FIG. 15A.
Figure 16B:
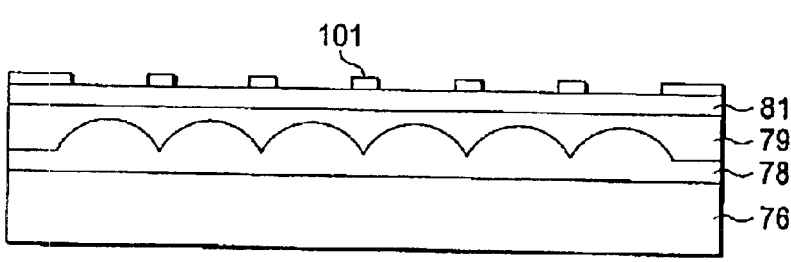
Figure 16C:
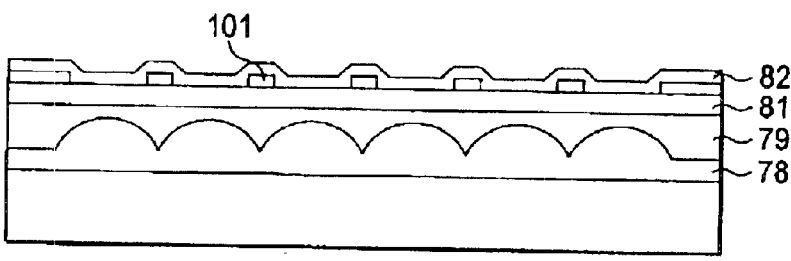
Figure 16D:
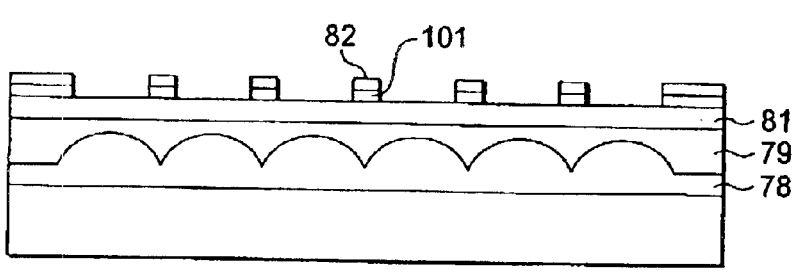
Figure 16E:
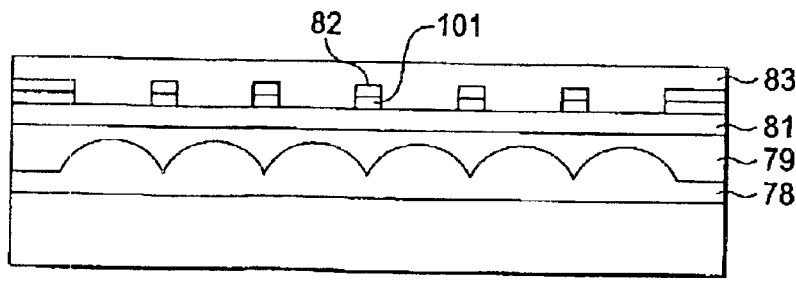

An exemplary manufacturing process of the light blocking member 82 is shown in FIGS. 16A to 16E. First, the cover substrate 81 is adhered to the lens resin layer 78 via the sealing resin layer 79, then the $SiO_2$ layer 101 is formed on the all surface of the cover substrate 81 (FIG. 16A). The $SiO_2$ layer 101 can be formed by the sputtering or the CVD method. Then, the $SiO_2$ layer 101 is etched using photoresist patterns formed by the semiconductor photolithography to form desired patterns (FIG. 16B). The etching methods of the $SiO_2$ layer 101 include the semiconductor plasma dry-etching such as the RIE method and the sputter-etching, and the wet-etching using a HF solution for example. After that, a film of the light blocking member 82 is formed on the all surface of the cover substrate 81 via the patterned $SiO_2$ layer 101 (FIG. 16C). The methods of forming the light blocking member 82 include the vacuum deposition, the sputtering, the CVD method, the electrolytic plating and the non-electrolytic plating. Then, the light blocking member 82 is etched using photoresist patterns made by the semiconductor photolithography, to form patterns, as in the SiO$_2$ layer 101 (FIG. 16D). The light blocking member 82 can be etched by the semiconductor plasma dry-etching, the wet-etching or the liftoff. Thus the light blocking member 82 is formed on the SiO$_2$ layer 101, and a transparent electrode 83 is provided thereon by the vacuum deposition, the sputtering or the CVD method (FIG. 16E).

Figure 17A:
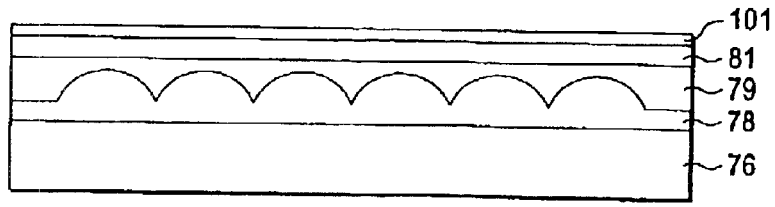
FIGS. 17A to 17E are cross-sectional views that illustrate another manufacturing processes of a back substrate used in the liquid crystal display panel shown in FIG. 15A.
Figure 17B:
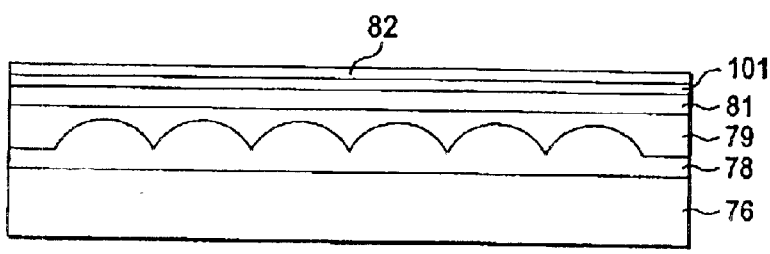
Figure 17C:
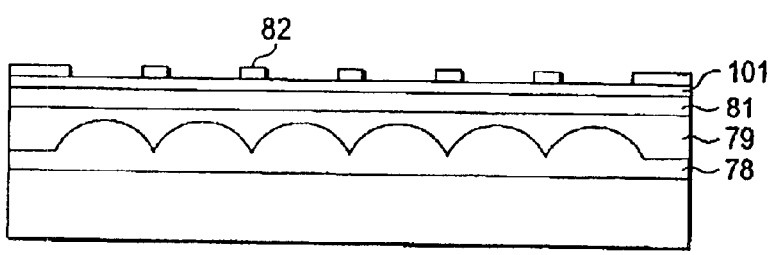
Figure 17D:
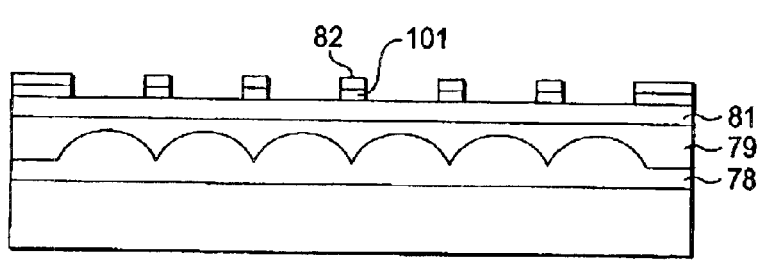
Figure 17E:
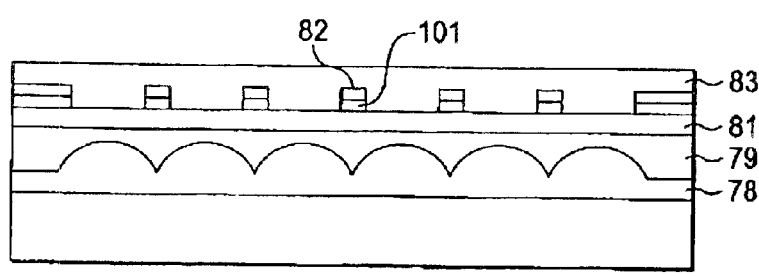

Otherwise, the light blocking member 82 may be formed in the order illustrated in FIGS. 17A to 17E. According to this process, the cover substrate 81 is adhered to the lens resin layer 78 via the sealing resin layer 79, then, the SiO$_2$ layer 101 is formed on the cover substrate 81 (FIG. 17A). The SiO$_2$ layer 101 can be formed by the sputtering or the CVD method. Then, the light blocking member 82 is formed on the SiO$_2$ layer 101 (FIG. 17B). The methods of forming the light blocking member 82 include the vacuum deposition, the sputtering, the CVD method, the electrolytic plating and the non-electrolytic plating. Then, the light blocking member 82 is etched using photoresist patterns made by the semiconductor photolithography, to form desired patterns (FIG. 17C). The light blocking member 82 can be etched by the semiconductor plasma dry-etching, the wet-etching, or the liftoff. Then, the SiO$_2$ layer 101 is etched using photoresist patterns made by the semiconductor photolithography, or using the patterned light blocking member 82 as mask patterns, to form patterns, as in the light blocking member 82 (FIG. 17D). The SiO$_2$ layer 101 may be etched by the semiconductor plasma dry-etching including the RIE method and the sputter-etching, or the wet-etching using a HF solution, for example. Thus, the SiO$_2$ layer 101 and the light blocking member 82 are formed, and the transparent electrode 83 is provided thereon by the vacuum deposition, the sputtering or the CVD method (FIG. 17E).

According to the method shown in FIGS. 17A to 17E, the SiO$_2$ layer 101 and the light blocking member 82 can be formed in situ, which improves the quality and the adhesion of the SiO$_2$ layer 101 and the light blocking member 82. Also, by using the light blocking member 82 having patterns made by etching, as the etching mask for the underlying SiO$_2$ layer 101, the photolithography process can be simplified, and the films can be aligned more accurately because they are formed in a self-aligned manner.

Third Embodiment

Figure 18A:
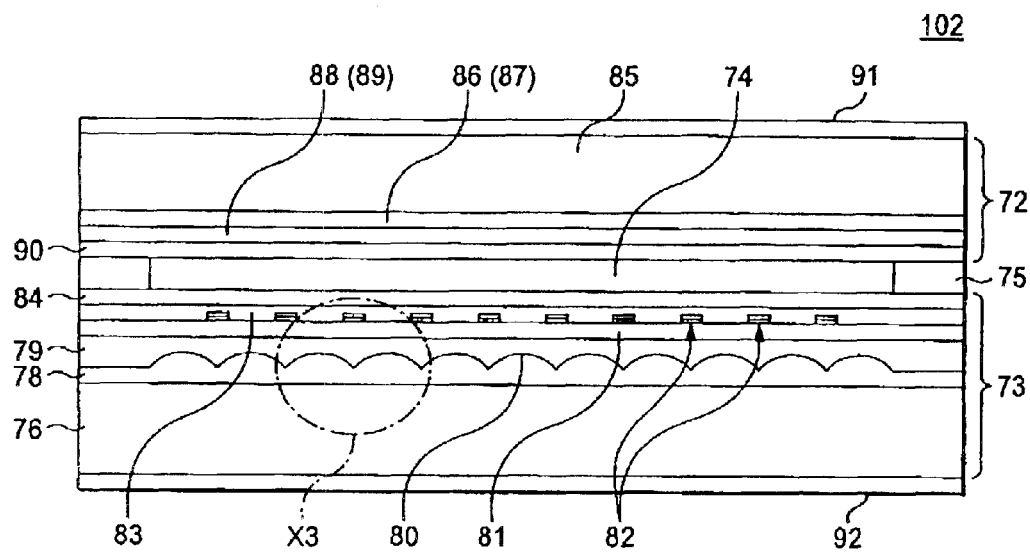
FIG. 18A is a cross-sectional view that schematically shows a construction of a liquid crystal display panel according to another embodiment of the invention.
Figure 18B:
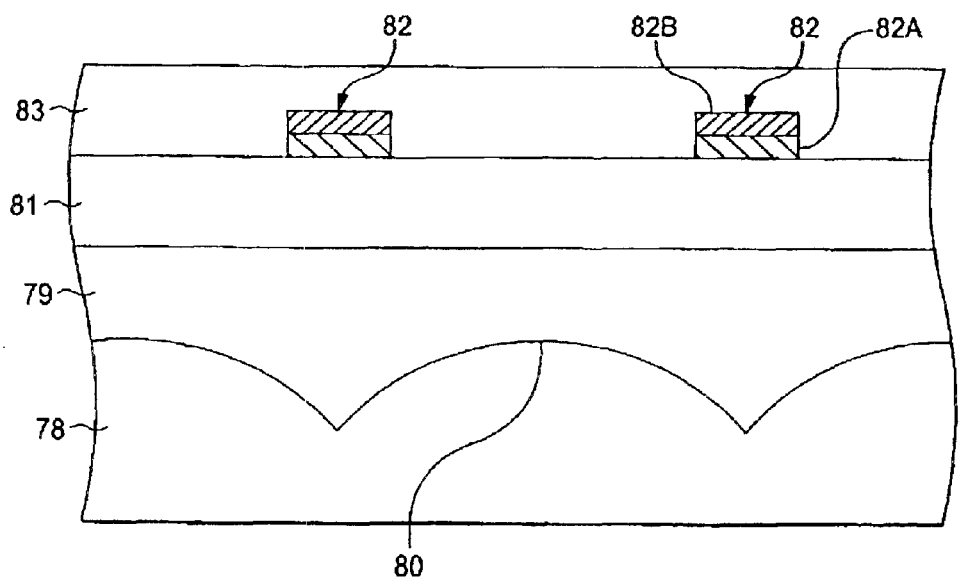
FIG. 18B is an expanded view of the X3 portion of FIG. 18A.

FIG. 18A is a cross-sectional view which schematically shows a liquid crystal display panel 102 according to another embodiment of the invention, and FIG. 18B is an enlarged view of the X3 portion of FIG. 18A. This liquid crystal display panel 102 has a construction similar to that of the liquid crystal display panel 71 shown in FIG. 6A, except that, the liquid crystal display panel 102 has a light blocking member 82 consisting of a plurality of layers. Although the light blocking member 82 comprises two layers in the liquid crystal display panel 102 shown in FIGS. 18A, 18B, the member may comprises three or more layers. The innermost (the light incident side) film 82A of the light blocking member 82 is formed with a material having high reflectance such as Al, Ag, Al—Si—Cu, and Al—Si. The outermost layer (the light exiting side) film 82B of the light blocking member 82 is formed with a material having high light absorptance such as Cr.

Figure 19:
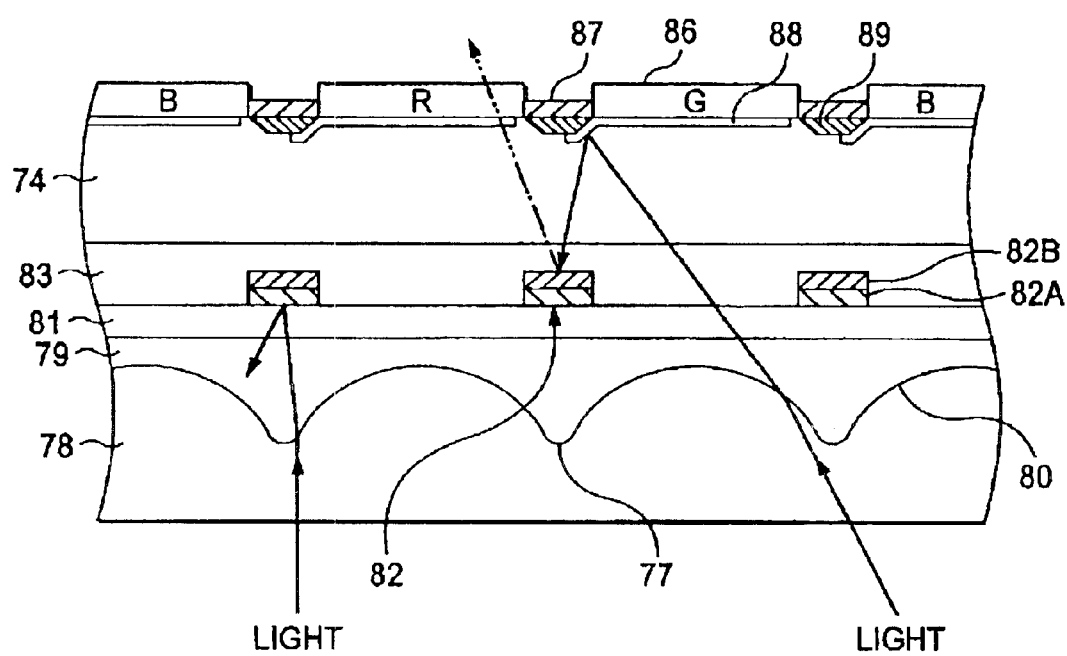
FIG. 19 is a view that illustrates the function of a light blocking member in the liquid crystal display panel shown in FIG. 18A.

FIG. 19 illustrates the function of the light blocking member 82 comprising a plurality of layers. Among the light incident from the light source device to the liquid crystal display panel 102, the portion which passed through the boundary edge 77 of the lens array 80 to proceed the light blocking member 82 is totally reflected by the innermost film 82A on the back surface having high reflectance, and cannot enter the TFTs 89. At this time, only little light is absorbed by the light blocking member 82, so that the rise in the temperature of the liquid crystal display panel 102 can be suppressed.

Also, when the light is incident on the back substrate 73 from an oblique direction, the light reached to the front substrate 72 is reflected or diffused by the TFT 89 or the pixel electrodes 88, and enters the light blocking member 82. If the light is further reflected by the light blocking member 82 as shown by the dot-dash line in FIG. 19, the reflected light may be stray light to cause malfunction of the liquid crystal display panel, or deteriorated contrast in the image. However, the liquid crystal display panel 102 as shown in FIG. 19 has such high light absorptance in the outermost film 82B of the light blocking member 82 that, if the light reflected or diffused by the TFTs 89 or the pixel electrodes 88 enters the light blocking member 82, the light is absorbed by the light blocking member 82 and cannot be stray light. This construction thus prevents malfunction of the liquid crystal display panel 102 or deteriorated contrast in the image which may caused by the stray light inside of the liquid crystal display panel 102.

The liquid crystal display panel 102 having such a construction can be manufactured in a manner similar to that of the liquid crystal display panel 71 according to the first embodiment (See FIGS. 12 to 14). However, as the light blocking member 82 comprises a plurality of layers, some modification is necessary. For example, when the light blocking member 82 comprises a Al film 82A and a Cr film 82B, the member 82 can be formed as shown in FIGS. 20A to 20E.

Figure 20A:
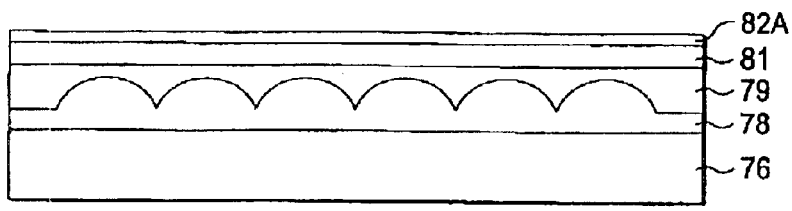
FIGS. 20A to 20E are cross-sectional views that illustrate manufacturing processes of a back substrate used in the liquid crystal display panel shown in FIG. 18A.
Figure 20B:
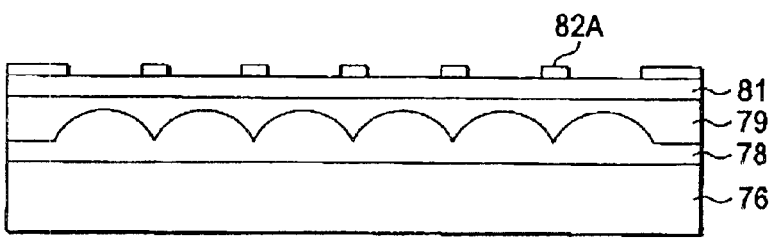
Figure 20C:
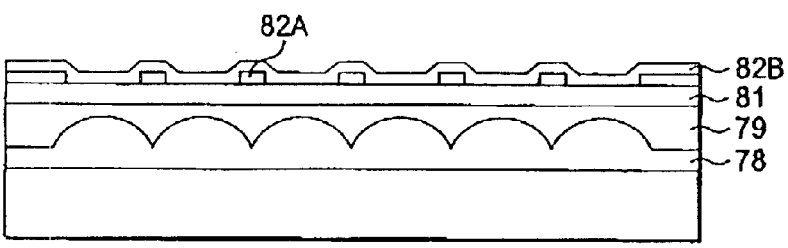
Figure 20D:
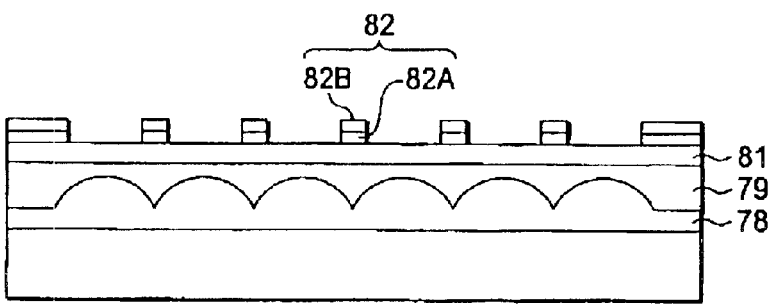
Figure 20E:
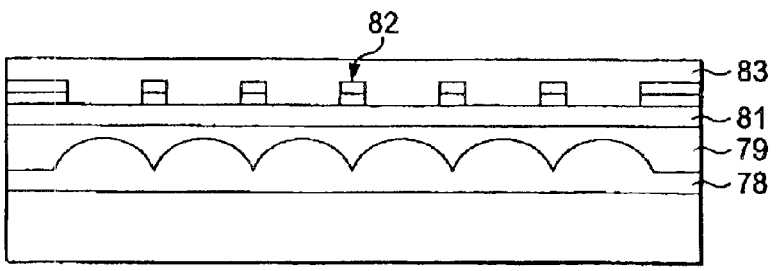

In this process, the cover substrate 81 is adhered to the lens resin layer 78 via the sealing resin layer 79, then the Al film 82 A is formed on the cover substrate 81 (FIG. 20A). The methods of forming the Al film 82A include the vacuum deposition, the sputtering and the CVD method. Then, the Al film 82A is etched using photoresist patterns made by the semiconductor photolithography, to form desired patterns (FIG. 20B). The Al film 82A can be etched by the semiconductor plasma dry-etching including the RIE method and the sputter-etching, or the wet-etching using a mixed solution of phosphoric acid, nitric acid and acetic acid, for example. Then, the Cr film 82B is formed on the patterned Al film 82A (FIG. 20C). The Cr film 82B can be formed by the vacuum deposition, the sputtering, the CVD method, the electrolytic plating or the non-electrolytic plating. The Cr film 82B is then etched using photoresist patterns formed by the semiconductor photolithography, to make patterns, as in the Al film 82A (FIG. 20D). The Cr film 82B can be etched by the semiconductor plasma dry-etching including the RIE method and the sputter-etching, or the wet-etching using a solution of sodium hydroxide and potassium ferricyanide, for example. Thus, the light blocking member 82 comprising the Al film 82A and the Cr film 82B is formed, and the transparent electrode 83 is provided thereon by the vacuum deposition, the sputtering or the CVD method (FIG. 20E).

Figure 21A:
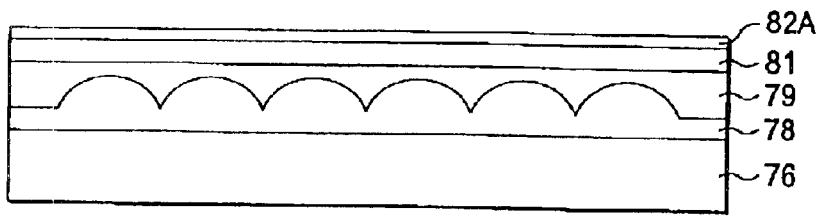
FIGS. 21A to 21E are cross-sectional views that illustrate another manufacturing processes of a back substrate used in the liquid crystal display panel shown in FIG. 18A.
Figure 21B:
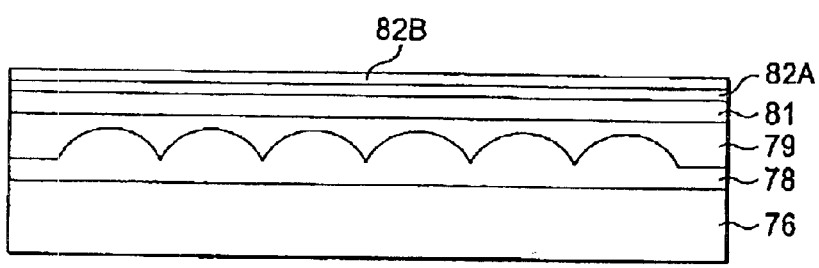
Figure 21C:
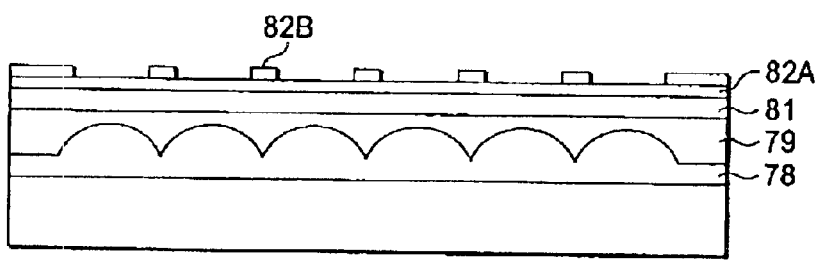
Figure 21D:
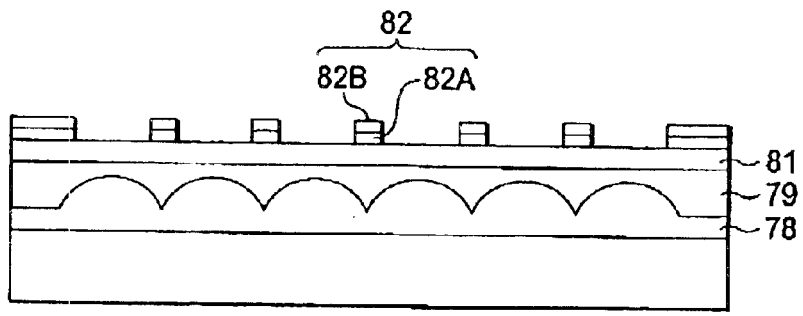
Figure 21E:
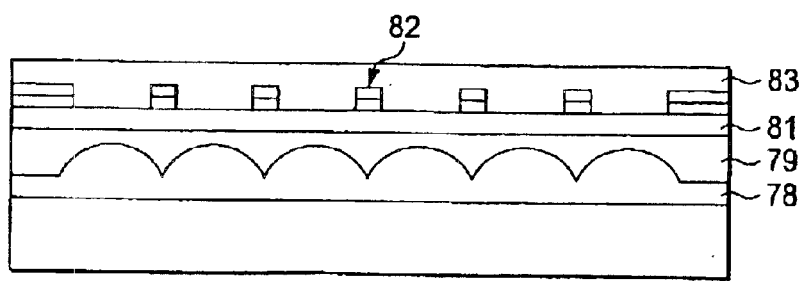

Otherwise, the light blocking member 82 may be formed in the order illustrated in FIGS. 21A to 21E. According to this process, the cover substrate 81 is adhered to the lens resin layer 78 via the sealing resin layer 79, then, the Al film 82A is formed on the cover substrate 81 (FIG. 21A). The Al film 82A can be formed by the vacuum deposition, the sputtering or the CVD method. Then, the Cr film 82B is formed on the Al film 82A (FIG. 21B). The methods of forming the Cr film 82B include the vacuum deposition, the sputtering, the CVD method, the electrolytic plating and the non-electrolytic plating. Then, the Cr film 82B is etched using photoresist patterns made by the semiconductor photolithography, to form desired patterns (FIG. 21C). The Cr film 82B can be etched by the semiconductor plasma dry-etching including the RIE method and the sputter-etching, or the wet-etching using a solution of sodium hydroxide and potassium ferricyanide, for example. Then, the Al film 82A is etched using photoresist patterns made by the semiconductor photolithography, or using the patterned Cr film 82B as mask patterns, to form patterns, as in the Cr film 82B (FIG. 21D). The Al film 82A may be etched by the semiconductor plasma dry-etching including the RIE method and the sputter-etching, or the wet-etching using a mixed solution of phosphoric acid, nitric acid and acetic acid, for example. Thus, the light blocking member 82 comprising the Al film 82A and the Cr film 82B is formed, and the transparent electrode 83 is provided thereon by the vacuum deposition, the sputtering, or the CVD method (FIG. 21E).

According to the method shown in FIGS. 21A to 21E, a film comprising a plurality of layers can be formed in situ, which improves the quality and adhesion of the films. Also, by using the upper film patterned by the etching (the Cr film) as the etching mask for the underlying film (the Al film), the photolithography process can be simplified, and the films can be aligned more accurately because they are formed in a self-aligned manner.

Fourth Embodiment

Figure 22A:
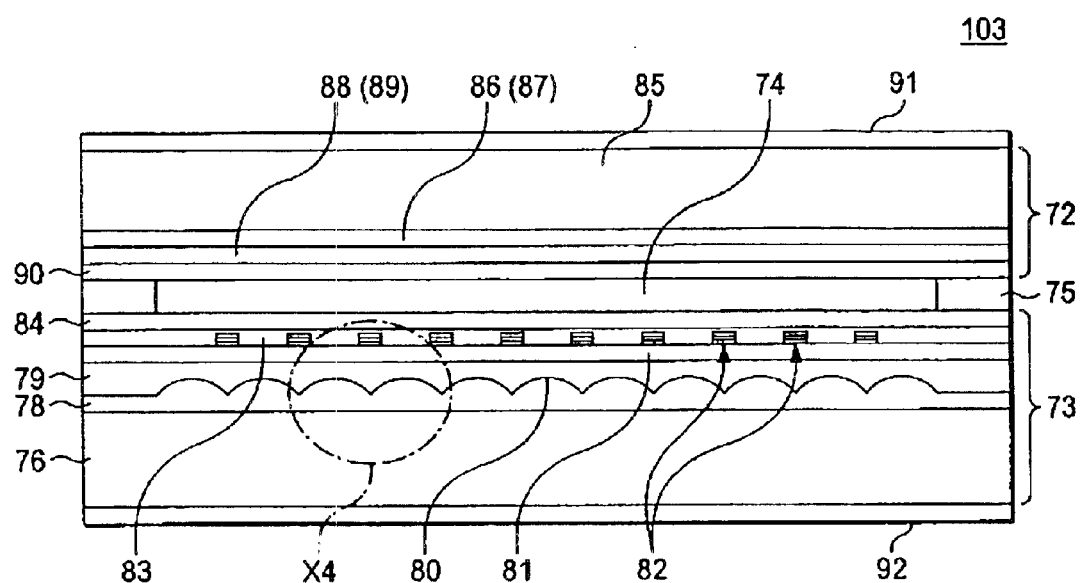
FIG. 22A is a cross-sectional view that schematically shows a construction of a liquid crystal display panel according to another embodiment of the invention.
Figure 22B:
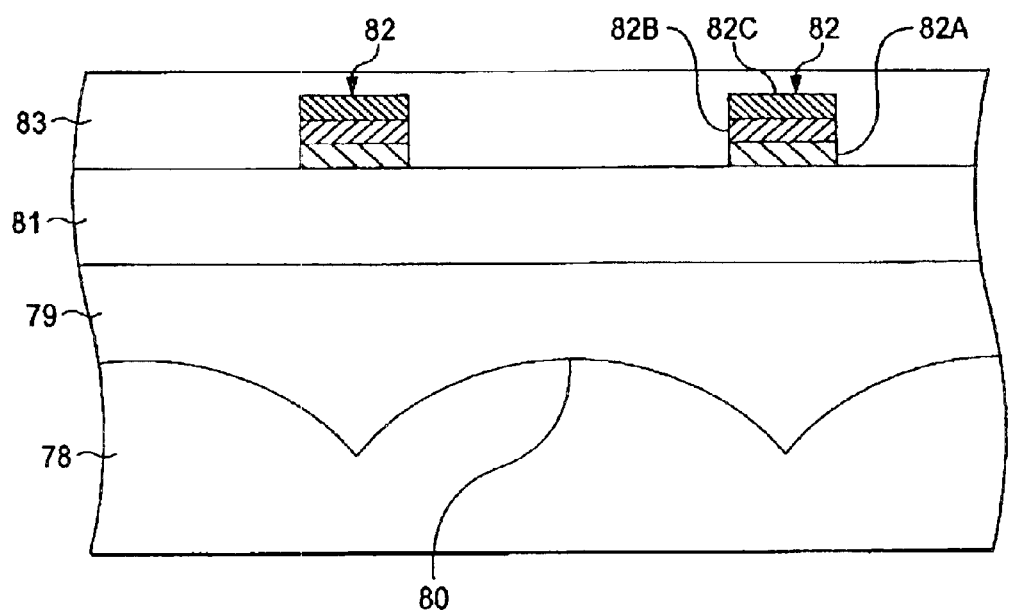
FIG. 22B is an expanded view of the X4 portion of FIG. 22A.

FIG. 22A is a cross-sectional view which schematically shows a liquid crystal display panel 103 according to another embodiment of the invention, and FIG. 22B is an enlarged view of the X4 portion of FIG. 22A. This liquid crystal display panel 103 has a construction similar to that of the liquid crystal display panel 71 shown in FIG. 6A, except that, the liquid crystal display panel 103 has the light blocking member 82 consisting of three layers. In the liquid crystal display panel 103 shown in FIGS. 22A, 22B, the innermost (the light incident side) film is made from a material having high reflectance such as Al, Ag, Al—Si—Cu, and Al—Si. The middle film 82B is made from a material having high light absorptance such as Cr. The outermost film 82C is made from chrome oxide such as $Cr_2O_3$ and $CR_5O_{12}$.

In the liquid crystal display panel 103 having the construction described above, the surface of the Cr film 82B is additionally covered by the chrome oxide film 82C. This construction further improves the light absorptance on the surface of the light blocking member 82 to effectively prevent the light reflected by the TFT 89 from being stray light.

The liquid crystal display panel 103 having such a construction can be manufactured in a manner similar to that for the liquid crystal display panel 71 according to the first embodiment (See FIGS. 12 to 14). However, some modification is necessary to form the light blocking member 82 as shown in FIGS. 23A to 23F, for example.

Figure 23A:
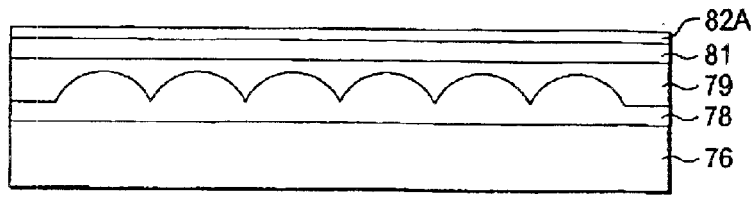
FIGS. 23A to 23F are cross-sectional views that illustrate manufacturing processes of a back substrate used in the liquid crystal display panel shown in FIG. 22A.
Figure 23B:
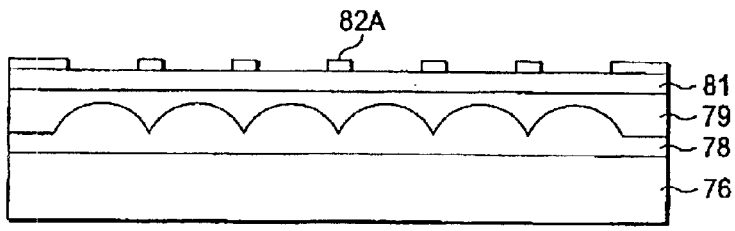
Figure 23C:
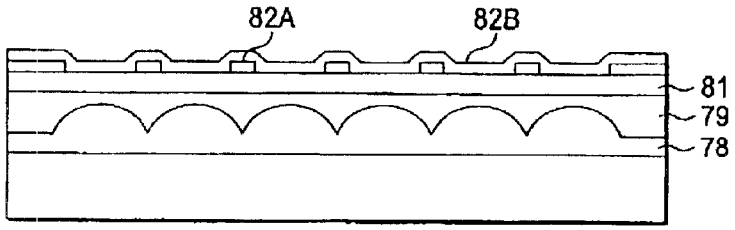
Figure 23D:
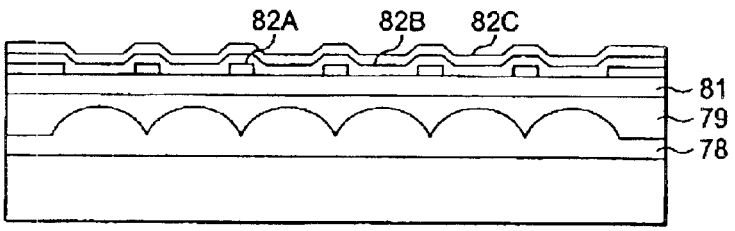
Figure 23E:
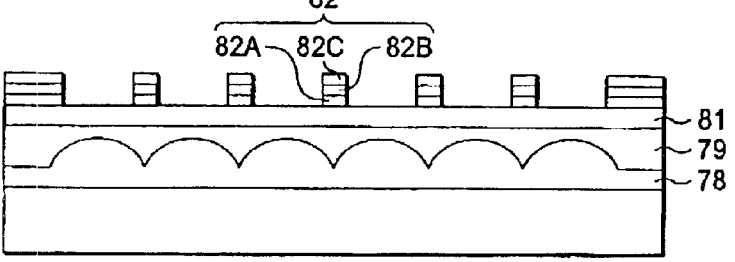
Figure 23F:
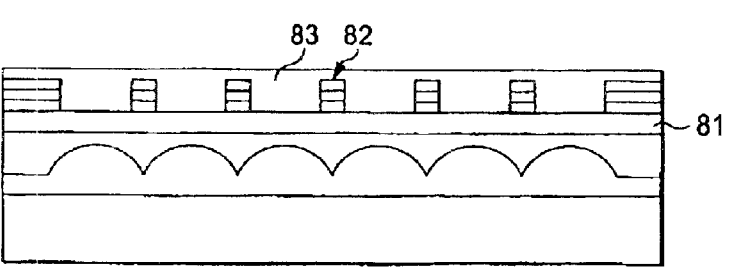

In this process, the cover substrate 81 is adhered to the lens resin layer 78 via the sealing resin layer 79, then the Al film 82A is formed on the cover substrate 81 (FIG. 23A). The methods of forming the Al film 82A include the vacuum deposition, the sputtering and the CVD method. Then, the Al film 82A is etched using photoresist patterns made by the semiconductor photolithography, to form desired patterns (FIG. 23B). The Al film 82A can be etched by the semiconductor plasma dry-etching including the RIE method and the sputter-etching, or the wet-etching using a mixed solution of phosphoric acid, nitric acid and acetic acid, for example. Then, the Cr film 82B is formed on the patterned Al film 82A (FIG. 23C). The Cr film 82B can be formed by the vacuum deposition, the sputtering, the CVD method, the electrolytic plating or the non-electrolytic plating. Next, the chrome oxide film 82C made from $Cr_2O_3$ for example, is formed on the Cr film 82B (FIG. 23D). The chrome oxide film 82C made from $Cr_2O_3$ can be formed by the vacuum deposition, the sputtering, or the CVD method. The chrome oxide film 82C and the Cr film 82B are then etched simultaneously using photoresist patterns formed by the semiconductor photolithography, to make patterns, as in the Al film 82A (FIG. 23E). The chrome oxide film 82C and the Cr film 82B can be etched by the semiconductor plasma dry-etching including the RIE method and the sputter-etching, or the wet-etching using a solution of sodium hydroxide and potassium ferricyanide, for example. Thus, the light blocking member 82 comprising the Al film 82A, the Cr film 82B and the chrome oxide film 82C is formed, and the transparent electrode 83 is provided thereon by the vacuum deposition, the sputtering or the CVD method (FIG. 23F).

Figure 24A:
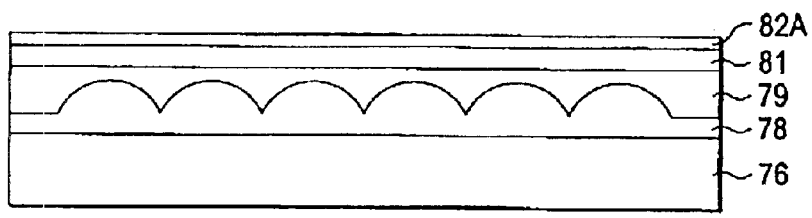
FIGS. 24A to 24F are cross-sectional views that illustrate another manufacturing processes of a back substrate used in the liquid crystal display panel shown in FIG. 22A.
Figure 24B:
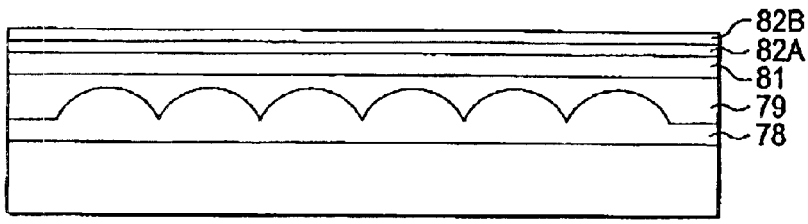
Figure 24C:
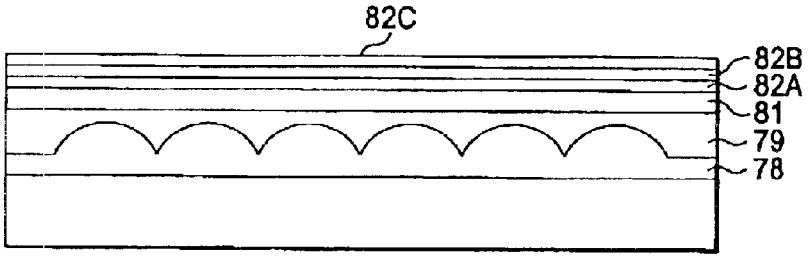
Figure 24D:
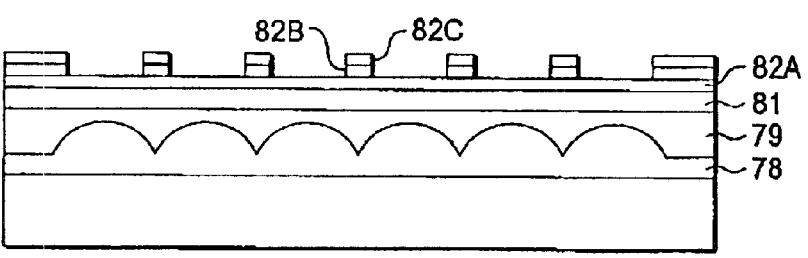
Figure 24E:
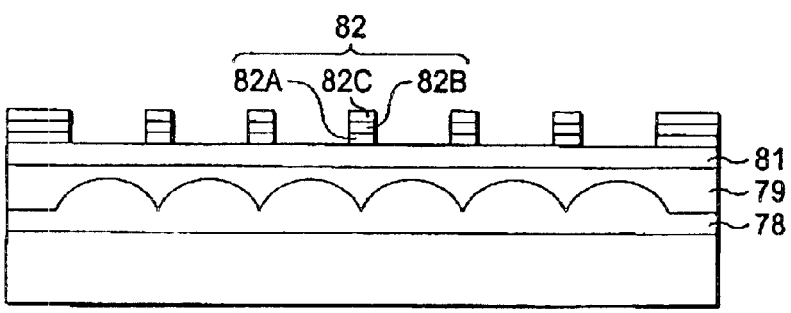
Figure 24F:
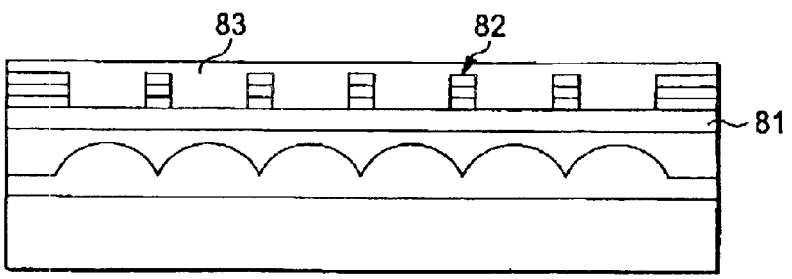

Otherwise, the light blocking member 82 may be formed in the order illustrated in FIGS. 24A to 24F. According to this process, the cover substrate 81 is adhered to the lens resin layer 78 via the sealing resin layer 79, then, the Al film 82A is formed on the cover substrate 81 (FIG. 24A). The Al film 82A can be formed by the vacuum deposition, the sputtering or the CVD method. Then, the Cr film 82B is formed on the Al film 82A (FIG. 24B). The methods of forming the Cr film 82B include the vacuum deposition, the sputtering, the CVD method, the electrolytic plating and the non-electrolytic plating. Then, the chrome oxide film 82C is formed on the Cr film 82B (FIG. 24C). The chrome oxide film 82C is formed by the vacuum deposition, the sputtering, or the CVD method. Then, the chrome oxide film 82C and the Cr film 82B is etched simultaneously using photoresist patterns made by the semiconductor photolithography, to form desired patterns (FIG. 24D). The chrome oxide film 82C and the Cr film 82B can be etched by the semiconductor plasma dry-etching including the RIE method and the sputter-etching, or the wet-etching using a solution of sodium hydroxide and potassium ferricyanide, for example. Then, the Al film 82A is etched using photoresist patterns made by the semiconductor photolithography, or using the patterned chrome oxide film 82C and the Cr film 82B as mask patterns, to form patterns, as in the chrome oxide film 82C and Cr film 82B (FIG. 24E). The Al film 82A may be etched by the semiconductor plasma dry-etching methods including the RIE method and the sputter-etching, or the wet-etching methods using a mixed solution of phosphoric acid, nitric acid and acetic acid, for example. Thus, the light blocking member 82 comprising the Al film 82A, the Cr film 82B and the chrome oxide film 82C is formed, and the transparent electrode 83 is provided thereon by the vacuum deposition, the sputtering, or the CVD method (FIG. 24F).

According to the method shown in FIGS. 24A to 24F, a film comprising a plurality of layers can be formed in situ, which improves the quality and the adhesion of the films. Also, by using the upper films patterned by the etching (the chrome oxide film and the Cr film) as the etching mask for the underlying film (the Al film), the photolithography process can be simplified, and the films can be aligned more accurately because they are formed in a self-aligned manner.

Figure 25A:
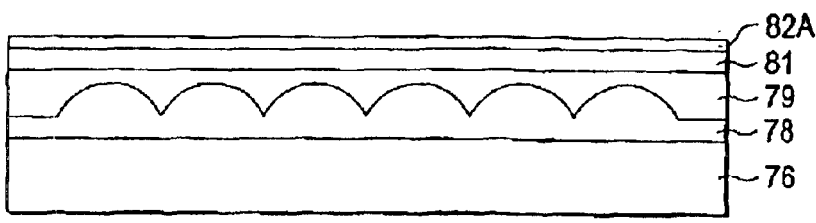
FIGS. 25A to 25F are cross-sectional views that illustrate another manufacturing processes of a back substrate used in the liquid crystal display panel shown in FIG. 22A.
Figure 25B:
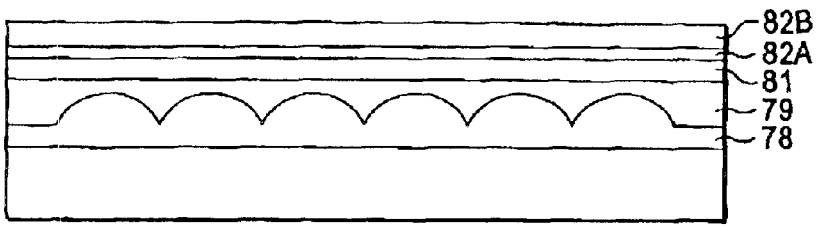
Figure 25C:
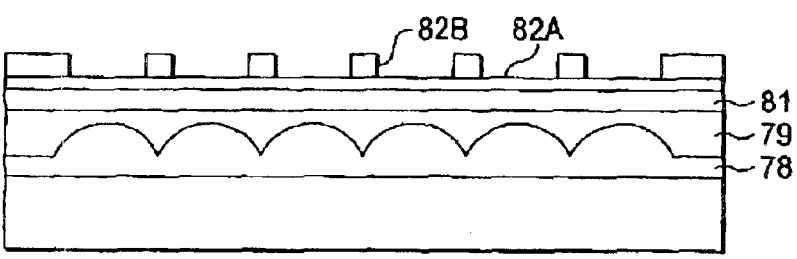
Figure 25D:
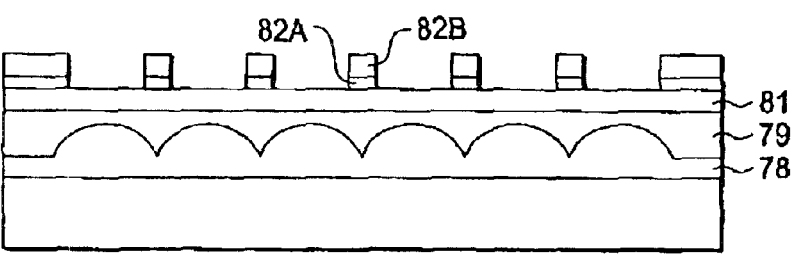
Figure 25E:
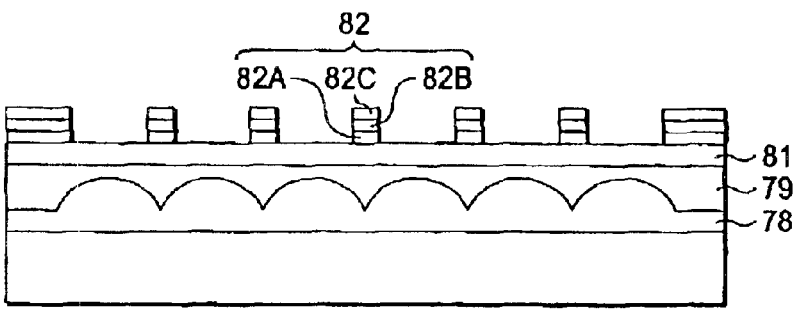
Figure 25F:
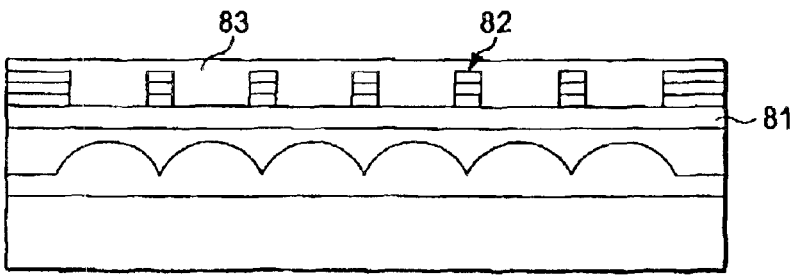

Otherwise, the light blocking member 82 may be formed in the order illustrated in FIGS. 25A to 25F. According to this process, the cover substrate 81 is adhered to the lens resin layer 78 via the sealing resin layer 79, then, the Al film 82A is formed on the cover substrate 81 (FIG. 25A). The Al film 82A can be formed by the vacuum deposition, the sputtering or the CVD method. Then, the Cr film 82B is formed on the Al film 82A (FIG. 25B). The methods of forming the Cr film 82B include the vacuum deposition, the sputtering, the CVD method, the electrolytic plating and the non-electrolytic plating. Then, the Cr film 82B is etched using photoresist patterns made by the semiconductor photolithography, to form desired patterns (FIG. 25C). The Cr film 82B can be etched by the semiconductor plasma dry-etching including the RIE method and the sputter-etching, or the wet-etching using a solution of sodium hydroxide and potassium ferricyanide, for example. Then, the Al film 82A is etched using photoresist patterns made by the semiconductor photolithography, or using the patterned Cr film 82B as mask patterns, to form patterns, as in the Cr film 82B (FIG. 25D). The Al film 82A may be etched by the semiconductor plasma dry-etching including the RIE method and the sputter-etching, or the wet-etching using a mixed solution of phosphoric acid, nitric acid and acetic acid, for example. Then, the patterned surface of the Cr film 82B is oxidized by $O_2$ plasma processing for example, to obtain a chrome oxide film 82C made from $Cr_2O_3$ (FIG. 25E). Thus, the light blocking member 82 comprising the Al film 82A, the Cr film 82B and the chrome oxide film 82C is formed, and the transparent electrode 83 is provided thereon by the vacuum deposition, the sputtering, or the CVD method (FIG. 25F).

According to the method shown in FIGS. 25A to 25F, a film comprising a plurality of layers can be formed in situ, which improves the quality and adhesion of the films. Also, by using the upper films patterned by the etching (the chrome oxide film and the Cr film) as the etching mask for the underlying film (the Al film), the photolithography process can be simplified, and the films can be aligned more accurately because they are formed in a self-aligned manner. Furthermore, according to this method, the chrome oxide film 82C can be obtained by the oxidation of the surface of the Cr film 82B, which realizes shortened process, reduced cost, without need for the alignment process.

Fifth Embodiment

Figure 26A:
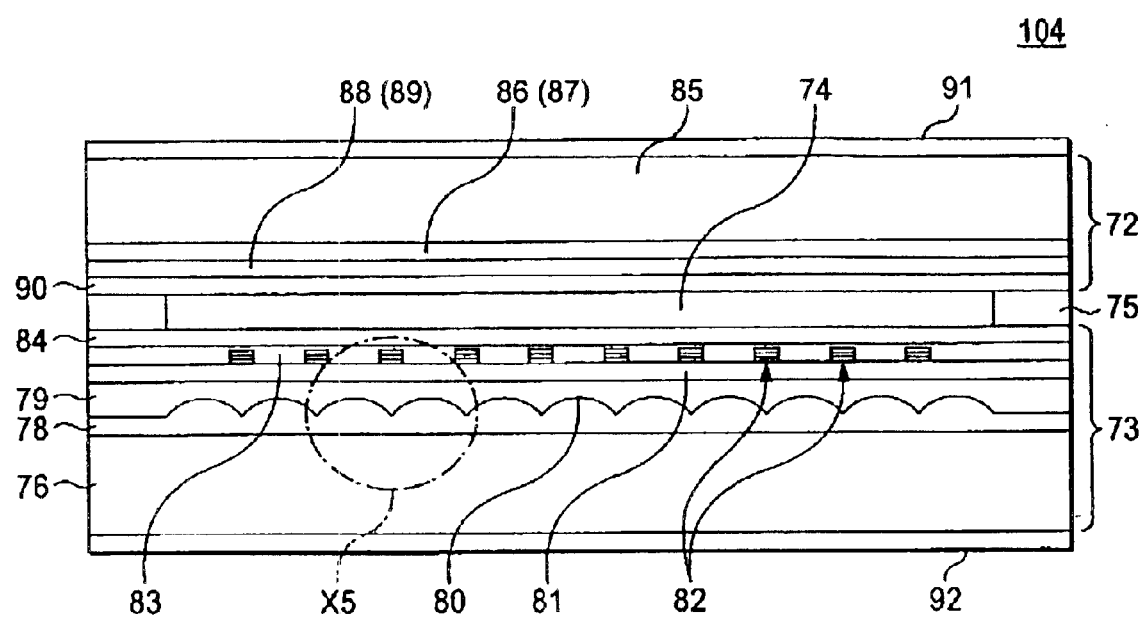
FIG. 26A is a cross-sectional view that schematically shows a construction of a liquid crystal display panel according to another embodiment of the invention.
Figure 26B:
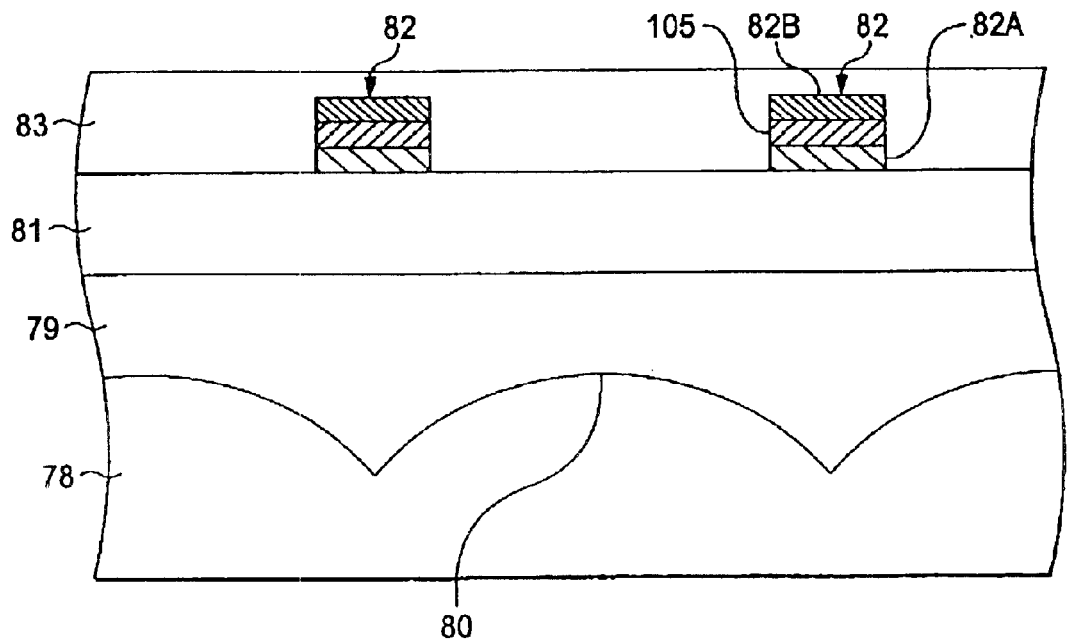
FIG. 26B is an expanded view of the X5 portion of FIG. 26A.

FIG. 26A is a cross-sectional view which schematically shows a liquid crystal display panel 104 according to another embodiment of the invention, and FIG. 26B is an enlarged view of the X5 portion of FIG. 26A. This liquid crystal display panel 104 has a construction similar to that of the liquid crystal display panel 71 shown in FIG. 6A, except that, in the liquid crystal display panel 104, an etching stop layer 105 is provided between the high reflectance film 82A and the high light absorption film 82B of the light blocking member 82. The innermost film 82A having high reflectance is made from a material such as Al, Ag, Al—Si—Cu, and Al—Si, while the film 82B having high light absorptance is made from Cr. The etching stop layer 105 is made from $SiO_2$, for example.

Figure 27A:
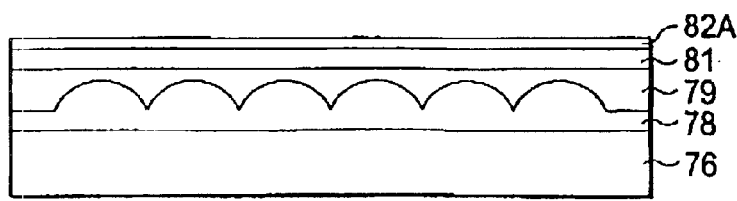
FIGS. 27A to 27G are cross-sectional views that illustrate manufacturing processes of a back substrate used in the liquid crystal display panel shown in FIG. 26A.
Figure 27B:
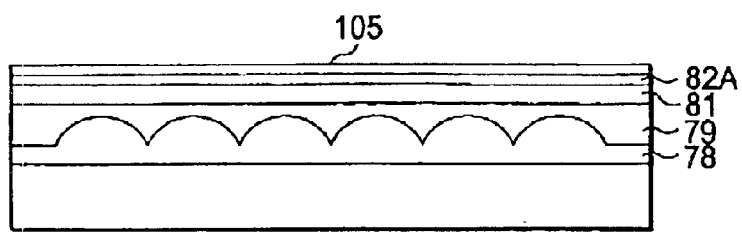

FIGS. 27A to G illustrate the process to form the light blocking member 82, in the whole process of manufacturing the liquid crystal display panel 104. The cover substrate 81 is adhered to the lens resin layer 78 via the sealing resin layer 79, then the Al film 82A is formed on the cover substrate 81 (FIG. 27A). The methods of forming the Al film 82A include the vacuum deposition, the sputtering and the CVD method. Then, the etching stop layer 105 made from $SiO_2$ is formed on the all surface of the Al film 82A (FIG. 27B). The $SiO_2$ film can be formed by the sputtering or the CVD method.

Figure 27C:
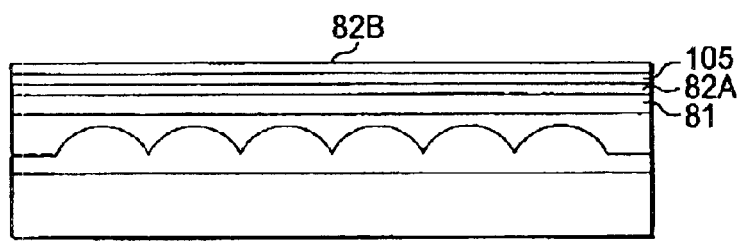

Then, the Cr film 82B is formed on the etching stop layer 105 (FIG. 27C). The chrome oxide film 82C can be formed by the vacuum deposition, the sputtering, the CVD method, the electrolytic plating or the non-electrolytic plating.

Figure 27D:
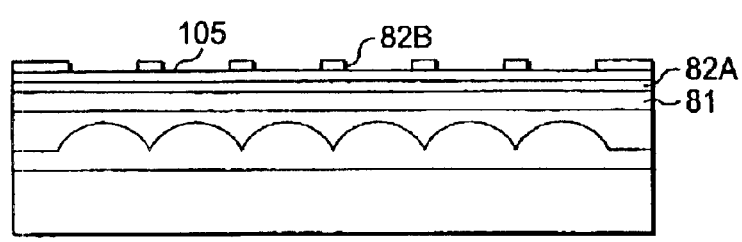
Figure 27E:
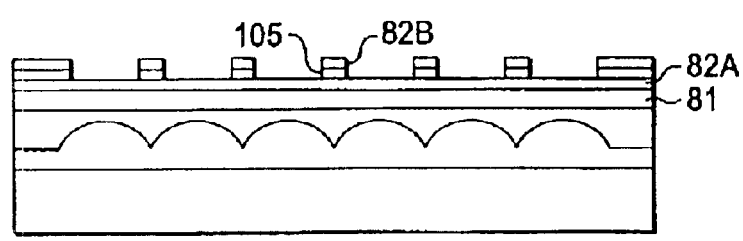

The Cr film 82B is then etched using photoresist patterns formed by the semiconductor photolithography, to make desired patterns (FIG. 27D). The Cr film 82B can be etched by the semiconductor plasma dry-etching including the RIE method and the sputter-etching, or the wet-etching using a solution of sodium hydroxide and potassium ferricyanide, for example. Then, the etching stop layer 105 is etched using photoresist patterns made by the semiconductor photolithography, or using the patterned Cr film 82B as mask patterns, to form patterns, as in the Cr film 82B (FIG. 27E). The $SiO_2$ may be etched by the semiconductor plasma dry-etching including the RIE method and the sputter-etching, or the wet-etching using a HF solution, for example.

Figure 27F:
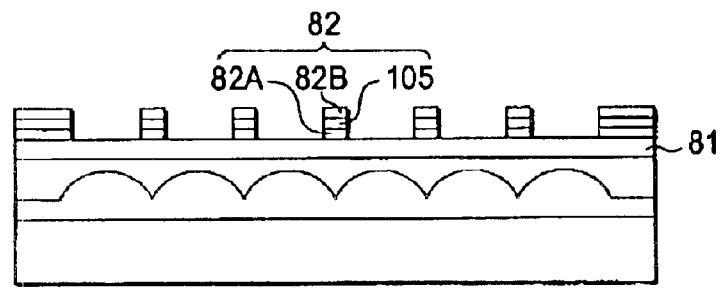
Figure 27G:
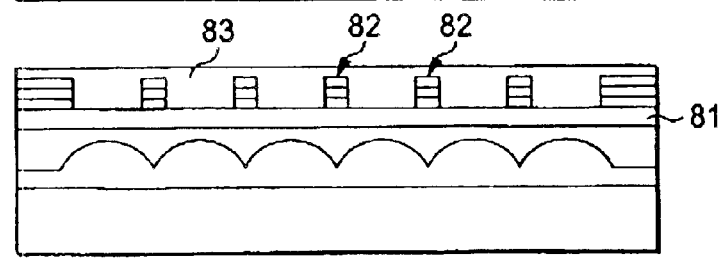

Next, the Al film 82A is etched using photoresist patterns made by the semiconductor photolithography, or using the patterned Cr film 82B as mask patterns, to form patterns, as in the Cr film 82B (FIG. 27F). The Al film 82A may be etched by the semiconductor plasma dry-etching including the RIE method and the sputter-etching, or the wet-etching using a mixed solution of phosphoric acid, nitric acid and acetic acid, for example. Thus, the light blocking member 82 comprising the Al film 82A, the etching stop layer 105 and the Cr film 82B is formed, and the transparent electrode 83 is provided thereon by the vacuum deposition, the sputtering, or the CVD method (FIG. 27G).

In forming the liquid crystal display panel 104, the etching stop layer 105 prevents the underlying Al film 82A from being etched when the upper Cr film 82B is etched, as shown in FIG. 27D. That is, this process can prevent the Al film 82A from being over-etched and reducing its width narrower than the Cr film 82B. Thus, the light blocking member 82 is not damaged by the etching, which improves the stability of the manufacturing process.

Although not shown in the figure, the Al film and the surface of the Al film (the light exiting side) may be oxidized to form an $Al_2O_3$ film, to form the light blocking member 82 comprising the Al film having high reflectance and the $Al_2O_3$ having high light absorptance.

Sixth Embodiment

Figure 28A:
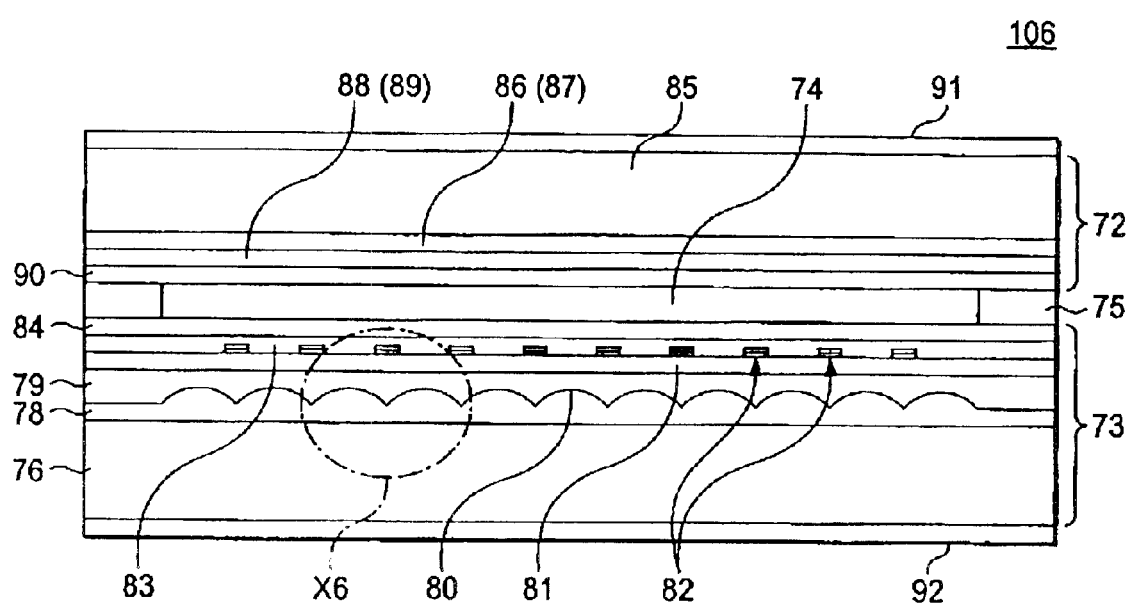
FIG. 28A is a cross-sectional view that schematically shows a construction of a liquid crystal display panel according to another embodiment of the invention.
Figure 28B:
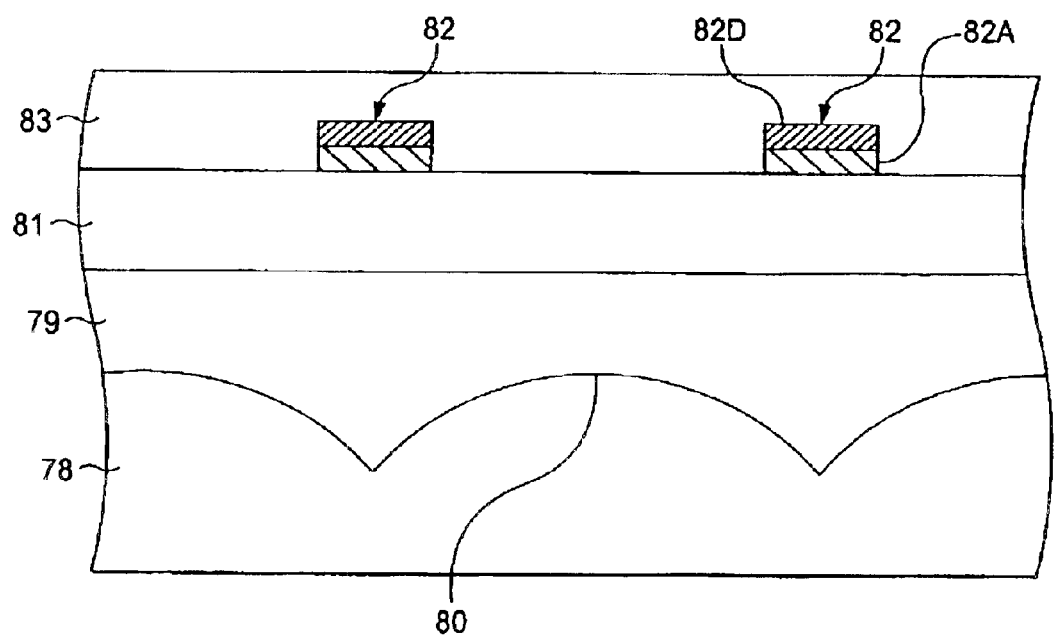
FIG. 28B is an expanded view of the X6 portion of FIG. 28A.

FIG. 28A is a cross-sectional view which schematically shows a liquid crystal display panel 106 according to another embodiment of the invention, and FIG. 28B is an enlarged view of the X6 portion of FIG. 28A. This liquid crystal display panel 106 has construction similar to that of the liquid crystal display panel 71 shown in FIG. 6A, except that, in the liquid crystal display panel 106, the light blocking member 82 comprises a film 82A made from Al, Ag, Al—Si—Cu or Al—Si having high reflectance, and a polymer layer 82D formed thereon. The polymer layer 82D may be made from any material as long as the material has higher light absorptance than Al.

In a liquid crystal display panel 106, the polymer layer 82D has a light absorption effect similar to that of the Cr film. That is, as in the case of the third embodiment (FIG. 18), if the light reflected or diffused by the TFTs 89 or the pixel electrodes 88 enters the light blocking member 82, the light is absorbed in the polymer layer 82D and will not be stray light. This construction thus prevents malfunction of the liquid crystal display panel 102 or deteriorated contrast in the image caused by the stray light inside of the liquid crystal display panel 102. Also, the polymer layer 82D can be formed at ambient temperature, which simplifies and stabilizes the manufacturing process of the back substrate 73 and the liquid crystal display panel 106.

The liquid crystal display panel 106 with such a construction can be manufactured in a manner similar to that for the liquid crystal display panel 71 according to the first embodiment. (See FIGS. 12 to 14). However, some modification is necessary to form the light blocking member 82 as shown in FIGS. 29A to 29D, for example.

Figure 29A:
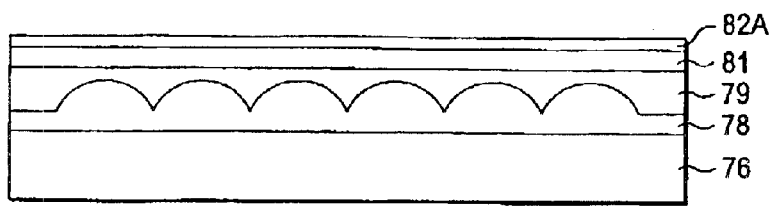
FIGS. 29A to 29D are cross-sectional views that illustrate manufacturing processes of a back substrate used in the liquid crystal display panel shown in FIG. 28A.
Figure 29B:
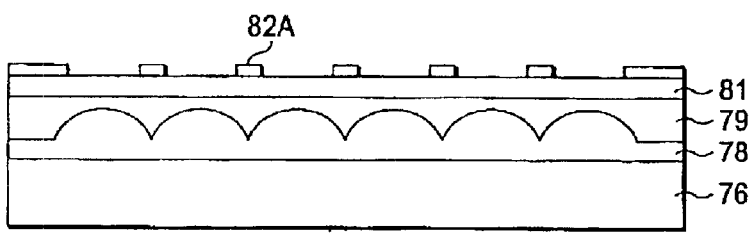
Figure 29C:
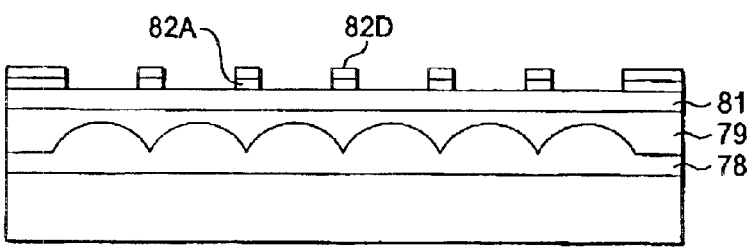
Figure 29D:
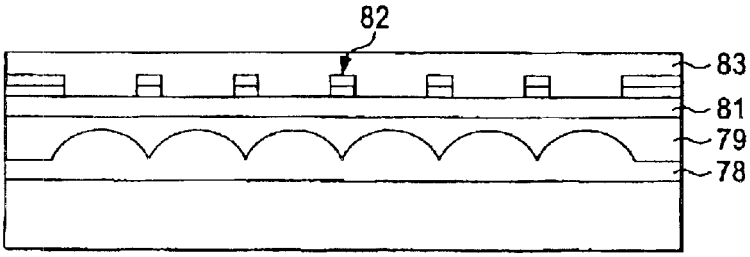

In this process, the cover substrate 81 is adhered to the lens resin layer 78 via the sealing resin layer 79, then the Al film 82A is formed on the cover substrate 81 (FIG. 29A). The methods of forming the Al film 82A include the vacuum deposition, the sputtering and the CVD method. Then, the Al film 82A is etched using photoresist patterns made by the semiconductor photolithography, to form desired patterns (FIG. 29B). The Al film 82A can be etched by the semiconductor plasma dry-etching including the RIE method and the sputter-etching, or the wet-etching using a mixed solution of phosphoric acid, nitric acid and acetic acid, for example. Then, the polymer layer 82D is formed on the patterned Al film 82A (FIG. 29C). The polymer layer 82D is formed directly on the Al film 82A only using a pattern printing method such as the printing or the screen printing, which eliminates the process to remove unnecessary portion of the polymer layer 82D. Thus, the light blocking member 82 comprising the Al film 82A and the polymer layer 82D is formed, and the transparent electrode 83 is provided thereon by the vacuum deposition, the sputtering or the CVD method (FIG. 29D).

The polymer layer 82D may be made from any appropriate material, particularly a photosensitive resin such as photosensitive polyimide. When a photosensitive resin is used for the polymer layer 82D, it absorbs the light reflected by the TFT 89 thus prevents the stray light. Furthermore, when the layer is patterned, as in the underlying film 82A, an etching process can be eliminated, resulting in a simplified and stabilized manufacturing process.

Figure 30A:
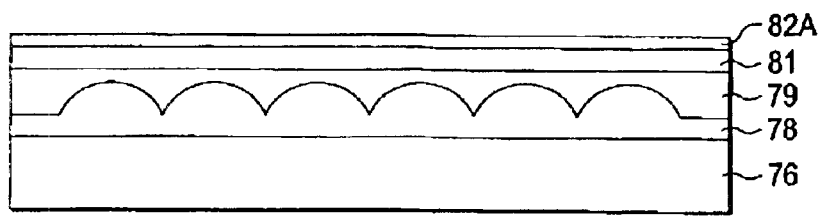
FIGS. 30A to 30E are cross-sectional views that illustrate another manufacturing processes of a back substrate used in the liquid crystal display panel shown in FIG. 28A.
Figure 30B:
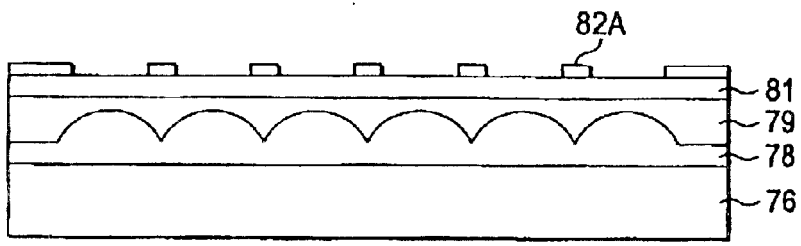
Figure 30C:
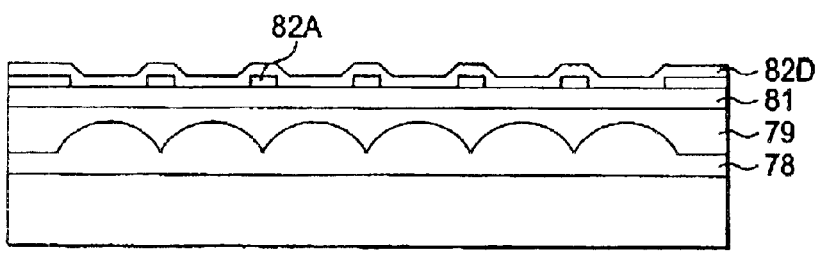
Figure 30D:
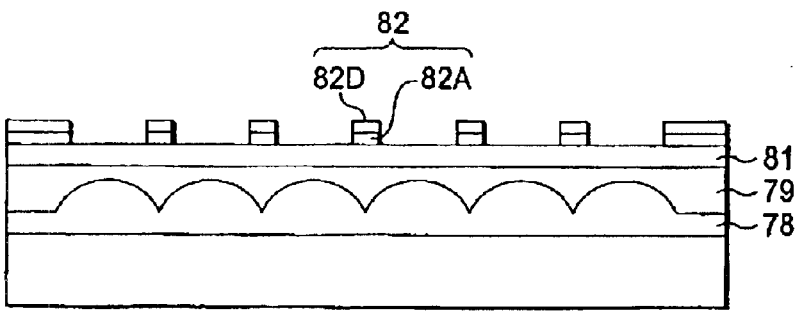
Figure 30E:
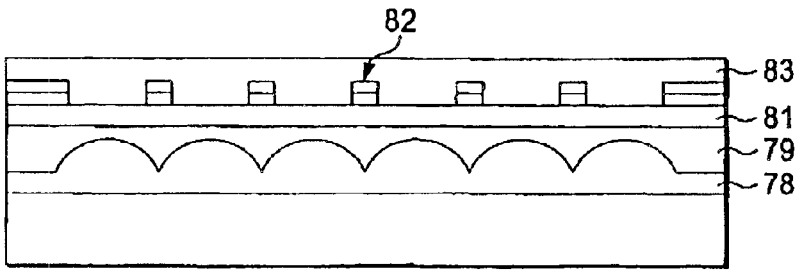

A manufacturing process of the light blocking member 82 using a photosensitive resin for the polymer layer 82D is illustrated in FIGS. 30A to 30E. According to this process, the cover substrate 81 is adhered to the lens resin layer 78 via the sealing resin layer 79, then, the Al film 82A is formed on the cover substrate 81 (FIG. 30A). The Al film 82A can be formed by the vacuum deposition, the sputtering or the CVD method. Then, the Al film 82A is etched using photoresist patterns made by the semiconductor photolithography, to form desired patterns (FIG. 30B). The Al film 82A can be etched by the semiconductor plasma dry-etching including the RIE method and the sputter-etching, or the wet-etching using a mixed solution of phosphoric acid, nitric acid and acetic acid, for example. Then, the photosensitive polyimide is applied on the patterned Al film 82A to form the polymer layer 82D (FIG. 30C). The photosensitive polyimide can be applied by spraying, applying (transferring), the spinner method, or screen printing. When using the screen printing, the photosensitive polyimide can be applied selectively on the upper surface of the Al film 82A only. Also, when the photosensitive polyimide is applied on the all surface of the cover substrate 81 via the Al film 82A by the spinner method, the photosensitive polyimide film is patterned, as in the Al film 82A by exposure and development using mask patterns. Then, the polymer layer 82D is processed with the semiconductor photolithography, to make patterns, as in the Al film 82A (FIG. 30D). Thus, the light blocking member 82 comprising the Al film 82A, the Cr film 82B and the chrome oxide film 82C is formed, and the transparent electrode 83 is provided thereon by the vacuum deposition, the sputtering or the CVD method (FIG. 30E).

Although not shown in the figure, a film 82A made from a material having a high refractive index such as Al and Ag may be formed on the cover substrate 81, then a film 82B made from a material having high light absorptance such as Cr may be formed thereon, then a polymer layer made from polyimide may be formed thereon.

Seventh Embodiment

Figure 31A:
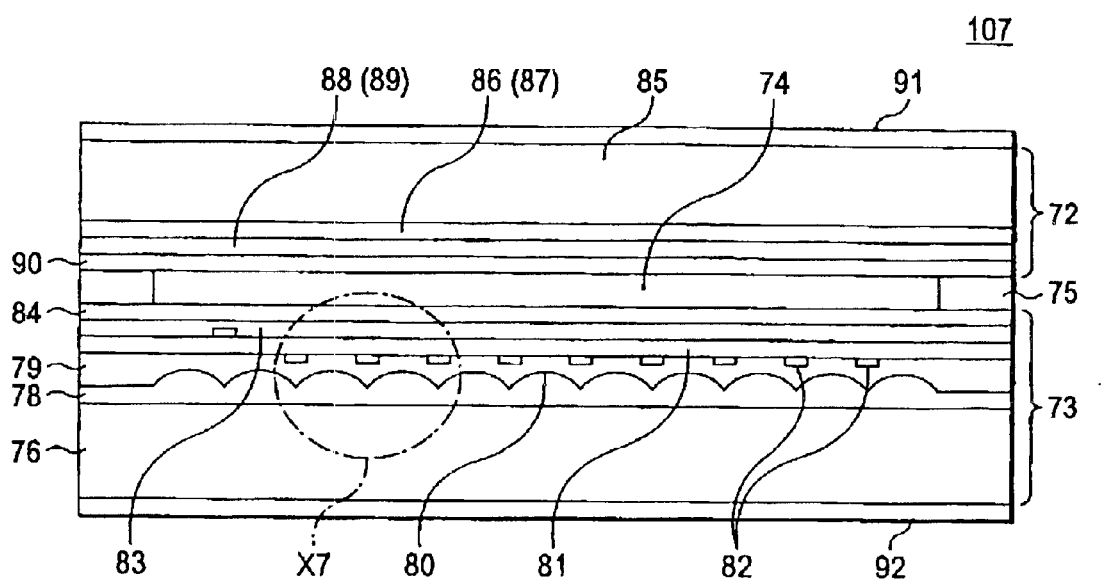
FIG. 31A is a cross-sectional view that schematically shows a construction of a liquid crystal display panel according to another embodiment of the invention.
Figure 31B:
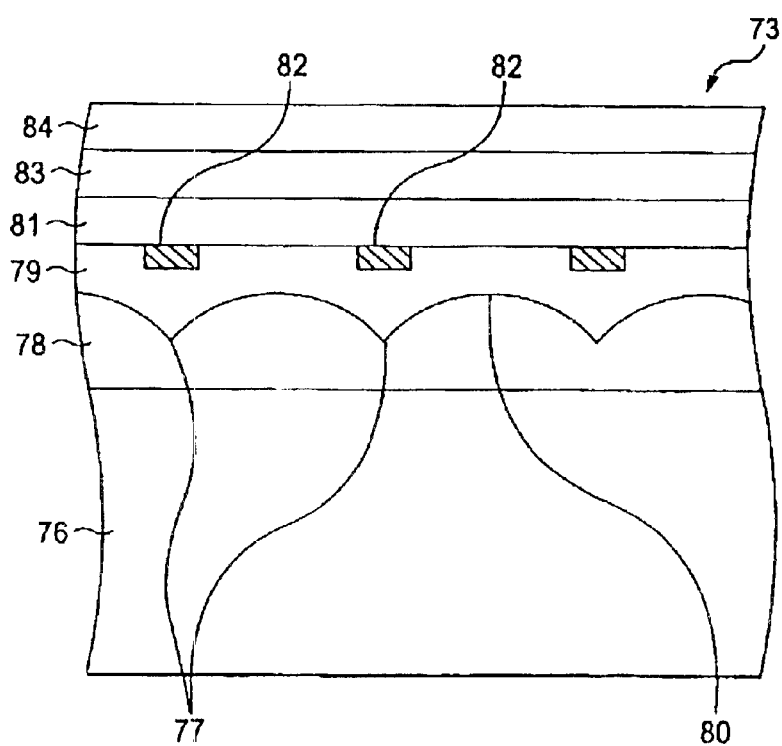
FIG. 31B is an expanded view of the X7 portion of FIG. 31A.

FIG. 31A is a cross-sectional view which schematically shows a liquid crystal display panel 107 according to another embodiment of the invention, and FIG. 31B is an enlarged view of the X7 portion of FIG. 31A. This liquid crystal display panel 107 has a construction similar to that of the liquid crystal display panel 71 shown in FIG. 6A, except that, in the liquid crystal display panel 107, the light blocking member 82 made from a material having high reflectance such as Al, Ag, Al—Si—Cu or Al—Si is provided on the back of the cover substrate 81 (the interface between the cover substrate 81 and the sealing resin layer 79).

In this construction, the light blocking member 82 is formed in a position near to the lens array 80, which further improves the light blocking effect of the light blocking member 82.

Figure 32A:
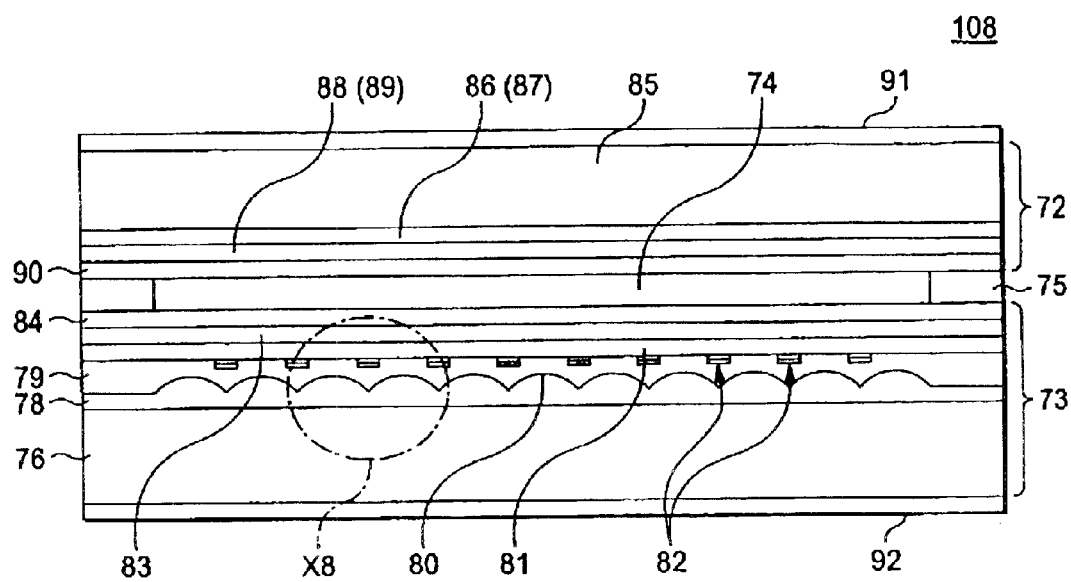
FIG. 32A is a cross-sectional view that schematically shows a construction of a liquid crystal display panel according to another embodiment of the invention.

FIG. 32A is a cross-sectional view which schematically shows a liquid crystal display panel 108 according to another embodiment of the invention, and FIG. 31B is an enlarged view of the X8 portion of FIG. 31A. In this liquid crystal display panel 108, the light blocking member 82 comprising a film 82A made from a material having high reflectance such as Al, Ag, Al—Si—Cu or Al—Si, and a film 82B made from a material with high light absorptance such as Cr is provided on the back of the cover substrate 81. In this construction, the film 82A having high reflectance is disposed on the light incident side, and the film 82B having high light absorptance is disposed on the light exiting side, that is, the film 82B made from Cr is adhered to the back surface of the cover substrate 81.

As Cr adheres to the glass more securely than Al, when the light blocking member 82 is provided on the back surface of the cover substrate 81, as in the liquid crystal display panel 108, the Cr film 82B can be disposed on the side of the cover substrate 81, which can enhance the adhesion of the light blocking member 82 to the cover substrate 81.

Figure 32B:
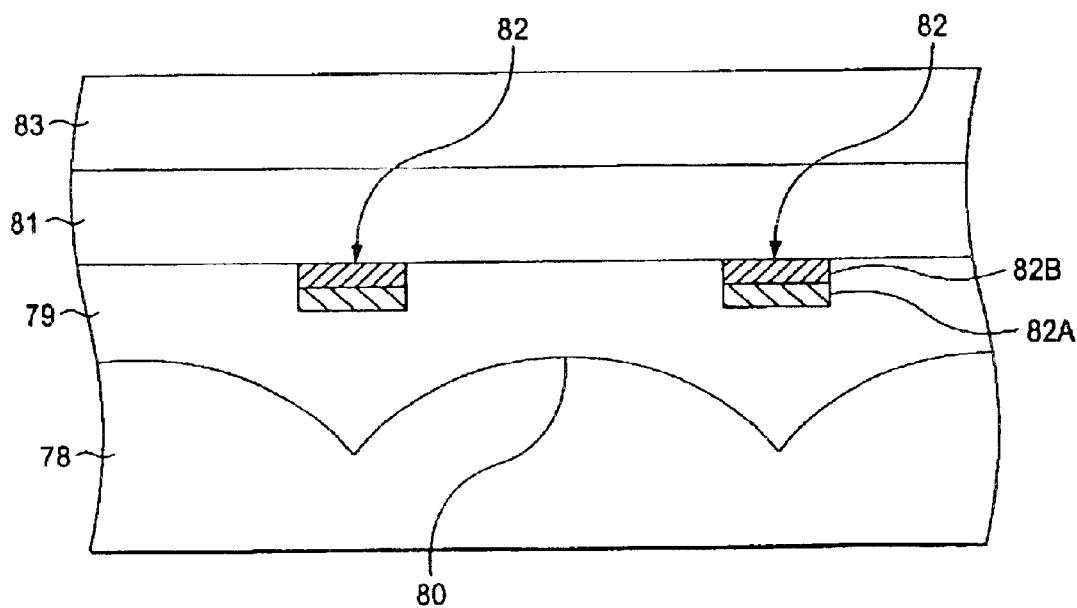
FIG. 32B is an expanded view of the X8 portion of FIG. 31A.
Figure 33A:
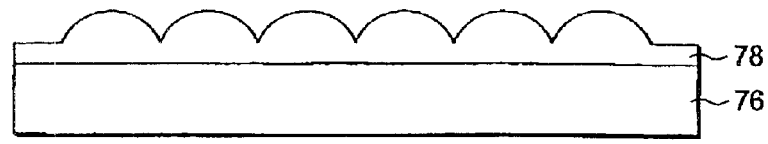
FIGS. 33A to 33G are cross-sectional views that illustrate manufacturing processes of a back substrate used in the liquid crystal display panel shown in FIG. 32A.
Figure 33B:
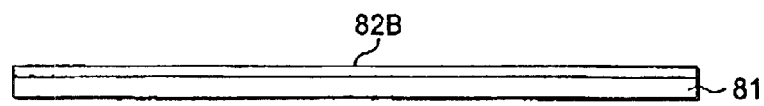
Figure 33C:
Figure 33D:
Figure 33E:
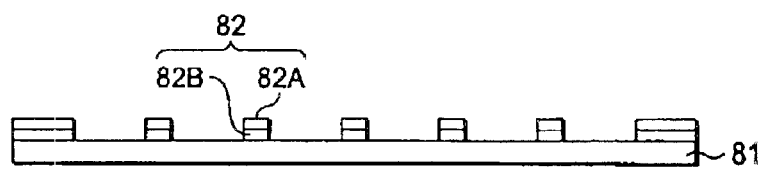
Figure 33F:
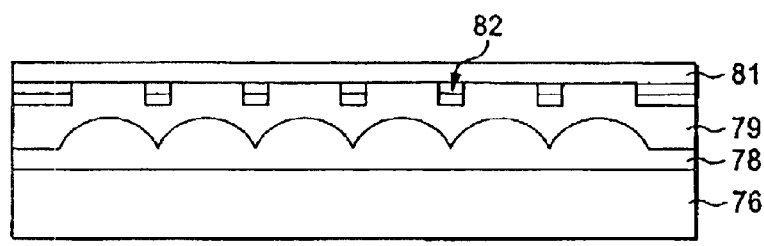
Figure 33G:
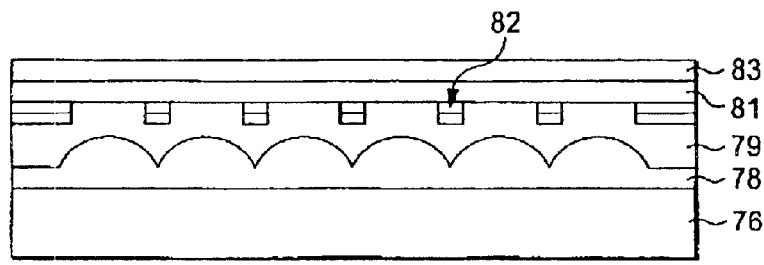

FIGS. 33A to 33G illustrate a manufacturing process of the light blocking member 82 according to the embodiment. The process will be described taking the liquid crystal display panel 108 shown in FIG. 32 as an example. First, a lens resin layer 78 is formed on the glass substrate 76, using an UV curing resin or thermosetting resin (FIG. 33A). A Cr film 82B is formed on the cover substrate 81 (FIG. 33B). The Cr film 82B can be formed by the vacuum deposition, the sputtering, the CVD method, the electrolytic plating or the non-electrolytic plating. Then, the Cr film 82B is etched using photoresist patterns made by the semiconductor photolithography, to form desired patterns (FIG. 33C). The Cr film 82B can be etched by the semiconductor plasma dry-etching such as the RIE method and the sputter-etching, or the wet-etching using a solution of sodium hydroxide and potassium ferricyanide, for example. Then, the Al film 82A is formed on the Cr film 82B (FIG. 33D). The Al film 82A can be formed by the vacuum deposition, the sputtering, or the CVD method. Then, the Al film 82A is etched using photoresist patterns made by the semiconductor photolithography, to form patterns, as in the Cr film 82B (FIG. 33E) The Al film 82A may be etched by the semiconductor plasma dry-etching including the RIE method or the sputter-etching, or the wet-etching using a mixed solution of phosphoric acid, nitric acid and acetic acid, for example. The light blocking member 82 comprising the Cr film 82B and the Al film 82A is thus formed on the back surface of the cover substrate 81. Then, the cover substrate 81 is adhered to the lens resin layer 78 via the sealing resin layer 79 (adhesive) (FIG. 33F). The cover substrate 81 is adhered so that the light blocking member 82 is disposed at the interface of the back surface of the cover substrate 81 and the sealing resin layer 79. Then, a transparent electrode 83 is provided on the cover substrate 81, by the vacuum deposition, the sputtering or CVD method (FIG. 33G).

Figure 34A:
Figure 34B:
Figure 34C:
Figure 33D:
Figure 34E:
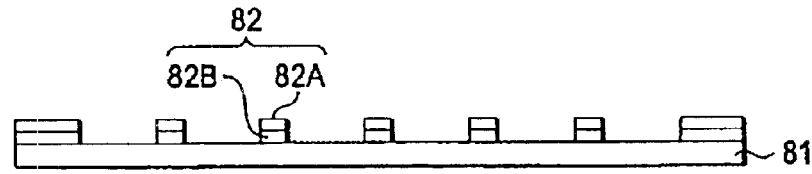
Figure 34F:
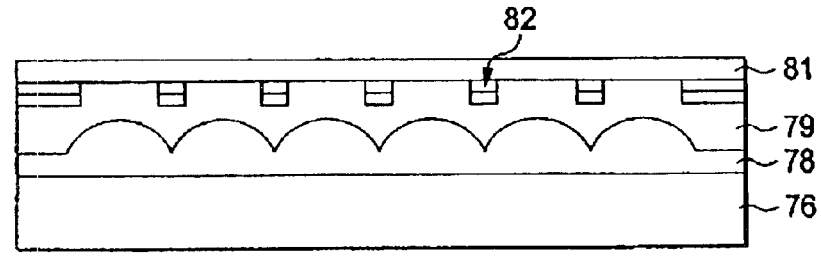
Figure 34G:
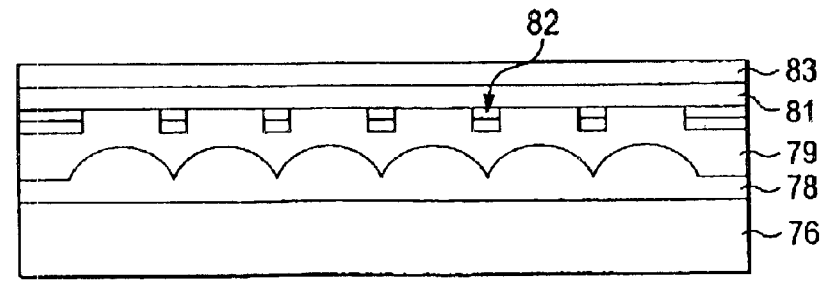

Otherwise, the light blocking member 82 may be formed in the order illustrated in FIGS. 34A to 34G. According to this process, a lens resin layer 78 is formed on the glass substrate 76, using an UV curing resin or a thermosetting resin (FIG. 34A). A Cr film 82B is formed on the cover substrate 81 (FIG. 34B). The Cr film 82B can be formed by the vacuum deposition, the sputtering, the CVD method, the electrolytic plating, or the non-electrolytic plating. Then, the Al film 82A is formed on the Cr film 82B (FIG. 34C). The Al film 82A can be formed by the vacuum deposition, the sputtering, or the CVD method. Then, the Al film 82A is etched using photoresist patterns made by the semiconductor photolithography, to form desired patterns (FIG. 34D). The Al film 82A may be etched by the semiconductor plasma dry-etching including the RIE method and the sputter-etching, or the wet-etching using a mixed solution of phosphoric acid, nitric acid and acetic acid, for example. Then, the Cr film 82B is etched using photoresist patterns made by the semiconductor photolithography, or using the patterned Al film 82A as the mask patterns, to form patterns, as in the Al film 82A (FIG. 34E). The Cr film 82B can be etched by the semiconductor plasma dry-etching such as the RIE method or the sputter-etching, or the wet-etching using a solution of sodium hydroxide and potassium ferricyanide, for example. The light blocking member 82 comprising the Cr film 82B and the Al film 82A is thus formed on the back surface of the cover substrate 81. Then, the cover substrate 81 is adhered to the lens resin layer 78 via the sealing resin layer 79 (adhesive) (FIG. 34F). The cover substrate 81 is adhered so that the light blocking member 82 is disposed at the interface of the back surface of the cover substrate 81 and the sealing resin layer 79. Then, a transparent electrode 83 is provided on the cover substrate 81, by the vacuum deposition, the sputtering or CVD method (FIG. 34G).

According to the method shown in FIGS. 34A to 34G, the Al film 82A and the Cr film 82B can be formed in situ, which improves the quality and the adhesion of the Al film 82A and the Cr film 82B. Also, by using the Al film 82A patterned by the etching as the etching mask for the Cr film 82B, the photolithography process can be simplified, and the films can be aligned more accurately because they are formed in a self-aligned manner.

Although the light blocking member 82 is disposed between the surface and the lens array 80 in the above exemplary embodiment, the light blocking member 82 may be disposed below the lens array 80, as well.

The lens array substrate according to the invention is provided with the light blocking member along the regions corresponding to the boundaries between the lenses, thus, the light blocking member can effectively block the light passed through these boundaries between the lenses. That is, the light passed through the boundaries between the lenses having molding error or rounded edge cannot diffuse in irregular direction. Furthermore, the light incident side of the light blocking member has such high reflectance that it is not prone to absorb the light, nor raise its temperature, which effectively minimizes the rise in the temperature of the lens array substrate.

Particularly, the liquid crystal display apparatus according to the invention can collect the incident light by each lens in the lens array. The incident light is collected to the pixel electrodes, which improves the efficiency of the light. Also, the light blocking members are provided along regions corresponding to the boundaries of lenses, the light blocking members can effectively block the light passed through those boundaries. Thus, the construction can prevent unstable function of the elements caused by the light which passed through any molding error or rounded boundary of the lens and irradiated on the TFTs. Furthermore, the light incident side of the light blocking member has such high reflectance that it is not prone to absorb the light, nor raise its temperature, which effectively minimizes the rise in the temperature of the liquid crystal display.

What is claimed is:

1. A lens array substrate having a lens array in which a plurality of lenses are aligned, wherein,
   a light blocking member is provided along the regions corresponding to the boundaries between the lenses,
   the light incident side of the light blocking member comprises a surface having high light reflectance, and,
   the light exiting side of the light blocking member comprises a surface having high light absorptance.

2. The lens array substrate in the claim 1, wherein the reflectance of the high reflectance surface is 70% or more.

3. The lens array substrate in the claim 1, wherein the light incident side of the light blocking member is made from Al or Ag.

4. The lens array substrate in the claim 1, wherein the light incident side of the light blocking member is added with at least one component which is contained in a member adjacent to the light incident side of the light blocking member.

5. The lens array substrate in the claim 1, wherein the light exiting side of the light blocking member is made from Cr.

6. The lens array substrate in the claim 1, wherein the light exiting side of the light blocking member is made from an oxide.

7. The lens array substrate in the claim 1, wherein the light exiting side of the light blocking member is made from a polymer.

8. The lens array substrate in the claim 7, wherein the polymer is a photosensitive polymer.

9. The lens array substrate in the claim 1, wherein the light blocking member has an etching stop layer between the layer constituting the high reflectance surface and the layer constituting the high light absorptance surface.

10. The lens array substrate in the claim 1, wherein the layer constituting the high light absorptance surface is formed on a glass surface oriented to the light incident direction, and the layer constituting the high reflectance surface is formed on the layer constituting the high light absorptance surface.

11. A liquid crystal display apparatus, wherein the lens array substrate in the claim 1 and an opposite substrate are disposed on the opposite sides each other, with a liquid crystal layer interposed therebetween, pixel electrodes are formed on either the lens array substrate or the opposite substrate, the pixel electrode facing to each lens in the lens array, and a transparent electrode is formed on the other of the lens array substrate or the opposite substrate.

* * * * *